(12) United States Patent
Yang et al.

(10) Patent No.: US 12,510,646 B2
(45) Date of Patent: Dec. 30, 2025

(54) METHOD FOR TRANSMITTING AND RECEIVING RADAR SIGNAL AND ELECTRONIC DEVICE THEREFOR

(71) Applicant: SAMSUNG ELECTRONICS CO., LTD., Suwon-si (KR)

(72) Inventors: Joonhyun Yang, Suwon-si (KR); Kyoungshin Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 288 days.

(21) Appl. No.: 18/107,168

(22) Filed: Feb. 8, 2023

(65) Prior Publication Data

US 2023/0184915 A1 Jun. 15, 2023

Related U.S. Application Data

(63) Continuation of application No. PCT/KR2022/015130, filed on Oct. 7, 2022.

(30) Foreign Application Priority Data

Oct. 8, 2021 (KR) .......................... 10-2021-0134470

(51) Int. Cl.
  *G01S 13/00* (2006.01)
  *G01S 7/02* (2006.01)
  (Continued)

(52) U.S. Cl.
  CPC ............ *G01S 13/003* (2013.01); *G01S 7/028* (2021.05); *G01S 7/35* (2013.01); *G01S 13/584* (2013.01); *G01S 13/86* (2013.01); *H04N 21/422* (2013.01)

(58) Field of Classification Search
  CPC .......... G01S 13/003; G01S 7/028; G01S 7/35; G01S 13/584; G01S 13/86; G01S 13/04;
  (Continued)

(56) References Cited

U.S. PATENT DOCUMENTS 7,898,344 B2  3/2011  Hongo
8,964,007 B2  2/2015  Price
(Continued)

FOREIGN PATENT DOCUMENTS

JP  4983409  7/2012
JP  2018059895  4/2018
(Continued)

OTHER PUBLICATIONS

Extended European Search Report dated Oct. 2, 2024 issued in European Patent Application No. 22878954.1.
(Continued)

*Primary Examiner* — Vladimir Magloire
*Assistant Examiner* — Naomi M Wolford
(74) *Attorney, Agent, or Firm* — NIXON & VANDERHYE P.C.

(57) ABSTRACT

A method of transmitting and receiving a radar signal is disclosed. The method includes: receiving a first chirp signal output by a second radar sensor located outside an electronic device, wherein the receiving is performed by a first radar sensor of the electronic device, changing an operation mode of the first radar sensor from a detection mode to a reception mode, based on the received first chirp signal, receiving a second chirp signal generated by the second radar sensor, through a receiver of the first radar sensor, according to the change to the reception mode, and obtaining information about at least one object located within a specified proximity of the electronic device, based on the received second chirp signal. The second chirp signal is generated based on the first chirp signal and a first response signal corresponding to the first chirp signal.

20 Claims, 24 Drawing Sheets

(51) Int. Cl.
*G01S 7/35* (2006.01)
*G01S 13/58* (2006.01)
*G01S 13/86* (2006.01)
*H04N 21/422* (2011.01)

(58) Field of Classification Search
CPC ........ G01S 7/003; G01S 13/343; G01S 13/42; G01S 13/341; G01S 7/032; G01S 7/352; G01S 13/62; H04N 21/422; H04N 21/42201; H04N 21/42204; H04N 21/44218; G06F 3/041; G06K 7/10188
See application file for complete search history.

(56) References Cited

U.S. PATENT DOCUMENTS

| | | | |
|---|---|---|---|
| 9,286,850 B2* | 3/2016 | Mori | ........................ G09G 5/00 |
| 10,866,650 B2 | 12/2020 | Cho et al. | |
| 10,956,355 B2 | 3/2021 | Sonnenschein | |
| 11,122,236 B2 | 9/2021 | Yuk et al. | |
| 2008/0106458 A1 | 5/2008 | Honda et al. | |
| 2015/0201236 A1* | 7/2015 | Al Remeithi | .... H04N 21/44218 348/77 |
| 2016/0047892 A1* | 2/2016 | Franceschini | ......... G01S 13/003 342/60 |
| 2019/0113609 A1 | 4/2019 | Baheti et al. | |
| 2020/0072941 A1 | 3/2020 | Jansen | |
| 2020/0132825 A1 | 4/2020 | Jungmaier et al. | |
| 2021/0003661 A1* | 1/2021 | Xu | ........................ G01S 13/931 |
| 2021/0063556 A1* | 3/2021 | Usaj | ........................ G01S 13/04 |
| 2022/0068178 A1* | 3/2022 | Davis | ........................ G09G 3/20 |

FOREIGN PATENT DOCUMENTS

| | | |
|---|---|---|
| KR | 10-1152250 | 6/2012 |
| KR | 10-2015-0089437 | 8/2015 |
| KR | 10-2190048 | 11/2015 |
| KR | 10-1744692 | 6/2017 |
| KR | 10-2167092 | 10/2020 |
| KR | 10-2452461 | 10/2022 |
| WO | 2020/259916 | 12/2020 |

OTHER PUBLICATIONS

International Search Report and Written Opinion of the ISA mailed Jan. 9, 2023 in PCT application PCT/KR2022/015130, 9 pages.
Murali et al., "Interference Detection in FMCW Radar Using A Complex Baseband Oversampled Receiver", IEEE, Apr. 2018, pp. 1567-1572.
Sun et al., "Real-Time Radar-Based Gesture Detection and Recognition Built in an Edge-Computing Platform", IEEE Sensors Journal, May 20, 2020, pp. 1-10.
[Online], BGT60TR13C 60 GHz Radar Sensor Datasheet V2.4.6, www.infineon.com, Jan. 8, 2021, 45 pages.
Cypress, PSoC 6 MCU: CY8C62x5 Data Sheet, revised Dec. 19, 2019, 70 pages.
Communication pursuant to Article 94(3) EPC dated Sep. 2, 2025 in European application 22 878 954.1-1206.

* cited by examiner

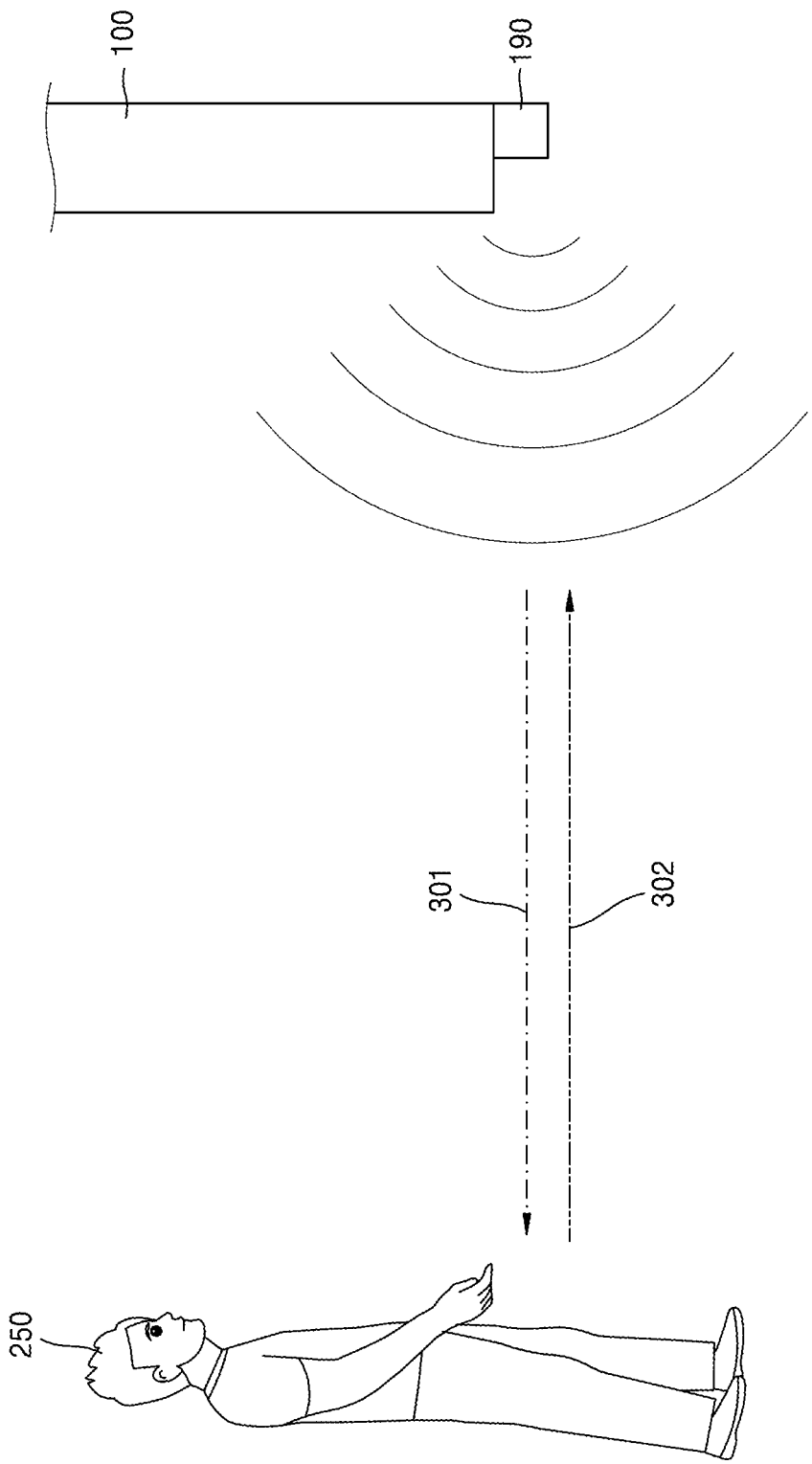

FIG. 3B
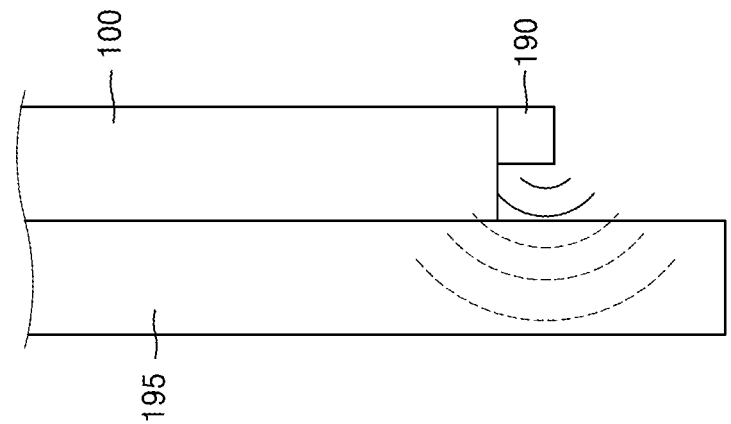
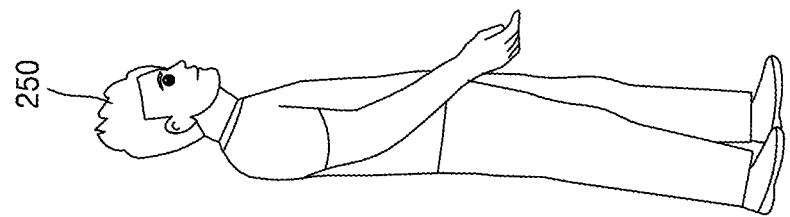

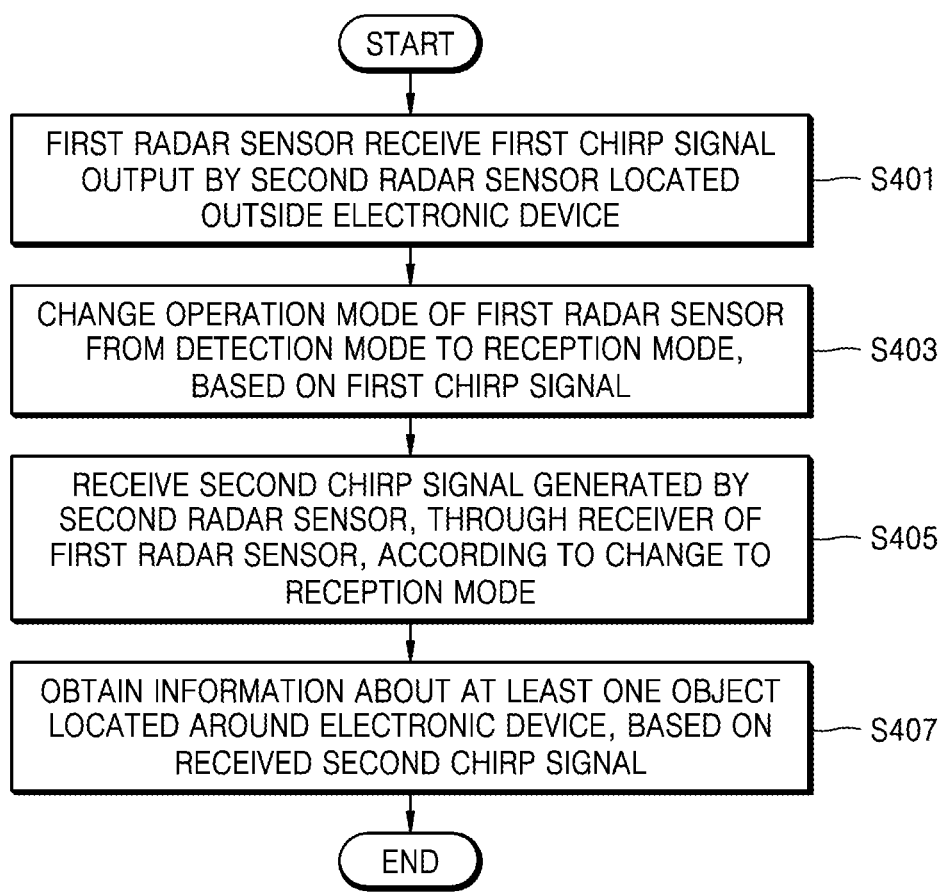

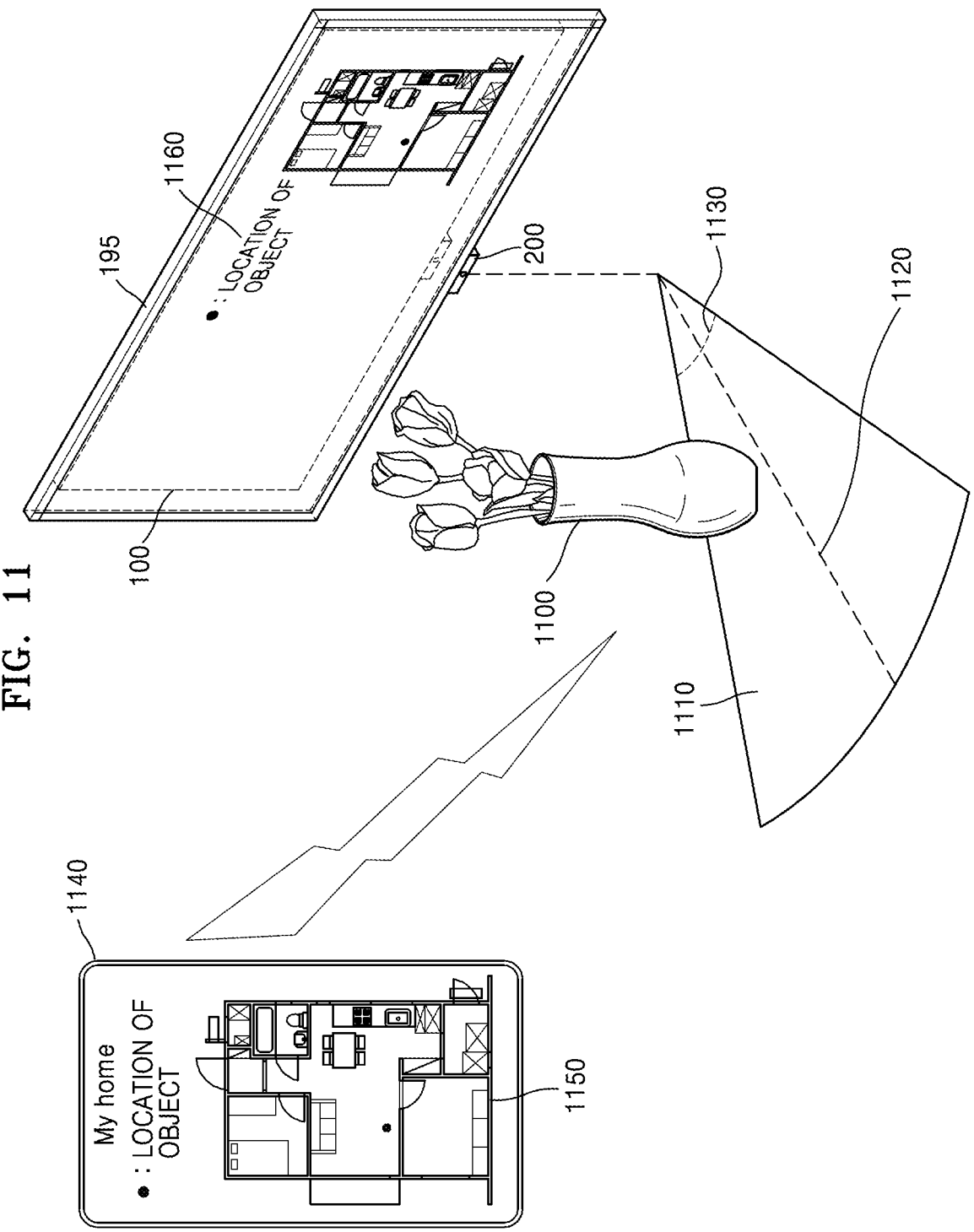

METHOD FOR TRANSMITTING AND RECEIVING RADAR SIGNAL AND ELECTRONIC DEVICE THEREFOR

CROSS-REFERENCE TO RELATED APPLICATIONS

This application is a continuation of International Application No. PCT/KR2022/015130 designating the United States, filed on Oct. 7, 2022, in the Korean Intellectual Property Receiving Office and claiming priority to Korean Patent Application No 10-2021-0134470, filed on Oct. 8, 2021, in the Korean Intellectual Property Office, the disclosures of which are incorporated by reference herein in their entireties.

BACKGROUND

Field

The disclosure relates to a method and device for transmitting and receiving a radar signal.

Description of Related Art

Television, which is a telecommunication mass medium transmitting video and image signals, transmits image information in monochrome or color, and delivers information including sound.

Conventional televisions used analog signals, and, in modern times, digital televisions capable of broadcasting and receiving video and sound using digital signals have emerged. In recent years, with the rise of the Internet of Things, various sensors have been mounted on televisions. Camera sensors may infringe personal privacy and have problems in that the amount of data to be processed is huge. Therefore, radar sensors instead of camera sensors can be mounted on televisions. Meanwhile, when a display device is disposed in a space, detachable decorative bezels made of various materials may be positioned on the bezel part of the display device to give the display device a picture frame or a work of art in consideration of aesthetics. However, such a decorative bezel may cover a radar sensor installed in the bezel part of the display device. Thus, in this case, the radar sensor installed in the bezel part of the display device may not properly operate.

SUMMARY

Embodiments of the disclosure provide an electronic device for transmitting and receiving a radar signal that enables an operation of a radar sensor installed on the bezel of a display device even when a decorative bezel is installed on the bezel of the display device for aesthetics.

According to an example embodiment of the disclosure, a method of transmitting and receiving a radar signal includes: receiving a first chirp signal output by a second radar sensor located outside an electronic device, wherein the receiving is performed by a first radar sensor of the electronic device; based on the received first chirp signal, changing an operation mode of the first radar sensor from a detection mode to a reception mode; receiving a second chirp signal generated by the second radar sensor through a receiver of the first radar sensor according to the change to the reception mode; and obtaining information about at least one object located within a specified proximity of the electronic device based on the received second chirp signal, wherein the second chirp signal is generated based on the first chirp signal and a first response signal corresponding to the first chirp signal.

According to an example embodiment of the disclosure, an electronic device configured to transmit and receive a radar signal includes: a first radar sensor including a receiver and a transmitter; a display; a memory storing one or more instructions; and at least one processor configured to execute the one or more instructions to: control the first radar sensor to receive a first chirp signal from a second radar sensor located outside the electronic device through the receiver of the first radar sensor; control an operation mode of the first radar sensor to change from a detection mode to a reception mode based on the received first chirp signal; control the first radar sensor to receive a second chirp signal generated by the second radar sensor, through the receiver of the first radar sensor, according to the change to the reception mode; and control information about at least one object located within a specified proximity of the electronic device to be obtained based on the received second chirp signal, wherein the second chirp signal is generated based on the first chirp signal and a first response signal corresponding to the first chirp signal.

According to an example embodiment of the disclosure, a radar sensor device configured to transmit and receive a radar signal includes: a signal generator comprising circuitry configured to generate a first chirp signal, a transmitter configured to output the first chirp signal; a receiver configured to receive a first response signal corresponding with the outputting of the first chirp signal, and a modulator configured to modulate the first chirp signal into a second chirp signal so that the second chirp signal corresponds to serial data generated based on the first response signal and the first chirp signal, wherein the transmitter is further configured to transmit the second chirp signal to an electronic device.

According to an example embodiment of the disclosure, a non-transitory computer-readable recording medium has recorded thereon a computer program, which, when executed by a computer, performs the above-described operations.

According to an example embodiment of the disclosure, a radar sensor of an electronic device may output a chirp signal, and may obtain location information or motion information about at least one object located around the electronic device, based on a response signal corresponding to the output chirp signal. However, when a decorative bezel is provided on a bezel part of the electronic device, the radar sensor of the electronic device may not effectively sense the at least one object located around the electronic device, due to the material or size of the electronic device. In this case, an external radar sensor may be attached to a portion of the decorative bezel, and the radar sensor may operate in a reception mode, based on a chirp signal of the external radar sensor. According to the change to the reception mode, the electronic device may smoothly obtain the location information or motion information about the at least one object located around the electronic device, using the external radar sensor.

According to an example embodiment of the disclosure, a first radar sensor of the electronic device may receive a first chirp signal of a second radar sensor located outside the electronic device, and may change the operation mode of the first radar sensor from a detection mode to the reception mode, based on the received first chirp signal. For example, the reception mode of the electronic device according to an example embodiment of the disclosure may be an operation mode of obtaining information about the at least one object, based on a second chirp signal received from the second radar sensor, and the detection mode of the electronic device may be an operation mode of obtaining information about the at least one object, based on a second response signal received in correspondence with outputting of a third chirp signal.

Moreover, the electronic device according to an example embodiment of the disclosure may determine whether the second radar sensor is located around the electronic device, based on the first chirp signal of the second radar sensor, without special component parts, and may obtain the information about the at least one object located around the electronic device, based on the second chirp signal of the second radar sensor.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3A is a diagram illustrating an example detection mode of a first radar sensor of an electronic device according to various embodiments;

FIG. 3B is a diagram illustrating an example detection mode of a first radar sensor of an electronic device to which a decorative bezel has been attached, according to various embodiments;

FIG. 4 is a flowchart illustrating an example radar signal transmission/reception method of changing an operation mode of a first radar sensor, based on a first chirp signal of a second radar sensor, according to various embodiments;

FIG. 11 is diagram illustrating an example operation of outputting a message including location information of at least one object through a display of an electronic device when the at least one object is located within a second search range of the electronic device according to various embodiments.

DETAILED DESCRIPTION

Figure 1A:
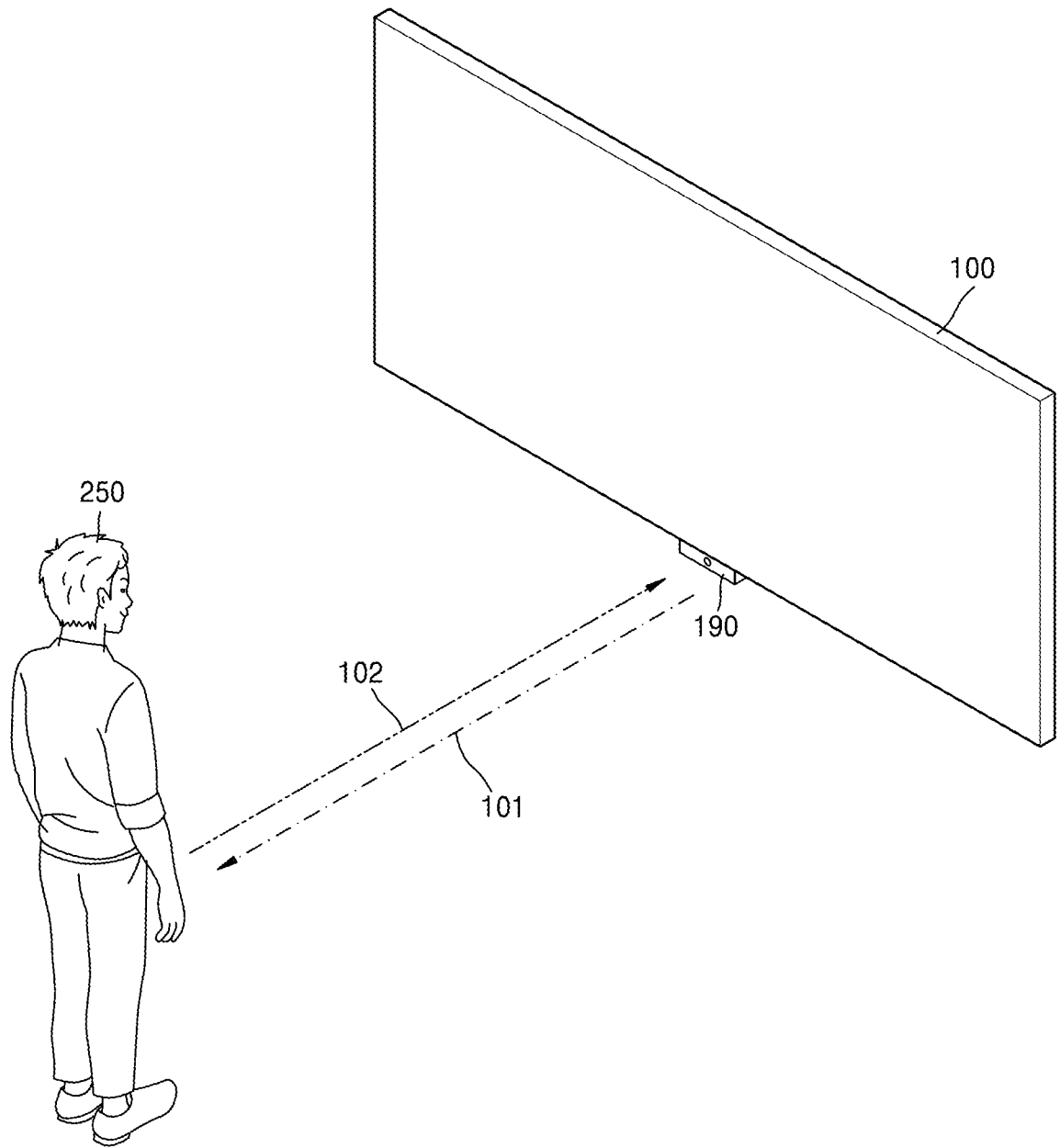
FIG. 1A is a diagram illustrating an electronic device and a first radar sensor of the electronic device, according to various embodiments.

Throughout the disclosure, the expression "at least one of a, b or c" indicates only a, only b, only c, both a and b, both a and c, both b and c, all of a, b, and c, or variations thereof.

Hereinafter, the terms used in the disclosure will be briefly described, and then the disclosure will be described in greater detail.

Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used. In this case, their meanings are provided in the disclosure. Hence, the terms must be defined based on their meanings and the contents of the entire disclosure, not by simply stating the terms.

The terms "comprises" and/or "comprising" or "includes" and/or "including" used herein specify the presence of stated elements, but do not preclude the presence or addition of one or more other elements. The terms "unit", "-er (-or)", and "module" when used in this disclosure refers to a unit in which at least one function or operation is performed, and may be implemented as hardware, software, or a combination of hardware and software.

Embodiments of the disclosure are described in greater detail herein with reference to the accompanying drawings. Embodiments of the disclosure may, however, be embodied in many different forms and should not be construed as being limited to the example embodiments set forth herein. In the drawings, parts irrelevant to the description may be omitted for simplicity of explanation, and like numbers refer to like elements throughout.

FIG. 1A is a diagram illustrating an example electronic device and a first radar sensor of the electronic device, according to various embodiments.

An electronic device 100 according to an embodiment of the disclosure may be an electronic device that outputs video and an image signal. The electronic device 100 may be a digital display device. The electronic device 100 may include, but is not limited to, a television. The electronic device 100 may be a digital television capable of broadcasting and receiving moving pictures and sounds using digital signals. According to an embodiment of the disclosure, the electronic device 100 may have any of various shapes. For example, the electronic device 100 may be, but is not limited to, a stationary type electronic device, a wall-mounted type electronic device, or a frame-type electronic device such as a picture frame. According to an embodiment of the disclosure, the electronic device 100 may have any of various sizes.

The electronic device 100 according to an embodiment of the disclosure may include a first radar sensor 190. The first radar sensor 190 may be included to measure the location, speed, angle, and the like of at least one object located around (the term "around" may also be used interchangeably with the phrase "within a specified proximity" in this context throughout the disclosure) the electronic device 100. For example, the first radar sensor 190 may measure the location, speed, and angle of a user 250 located around the electronic device 100, based on an output signal 101 and a response signal 102. The first radar sensor 190 may be located on a bottom surface of the electronic device 100, but embodiments are not limited thereto.

The first radar sensor 190 according to an embodiment of the disclosure may be a sensor that calculates a location, an angle, a distance, and the like of a sensed object (for example, the user 250), based on the output signal 101 and the response signal 102. The first radar sensor 190) may include a plurality of first radar sensors. A structure of the first radar sensor 190 will be described later in more detail with reference to FIG. 2C.

The output signal 101 according to an embodiment of the disclosure may include an electronic wave signal. For example, the output signal 101 may be, but is not limited to, a chirp signal generated by a signal generator 191 of the first radar sensor 190 and transmitted by a transmitter 192 of the first radar sensor 190.

The response signal 102 according to an embodiment of the disclosure may include an electronic wave signal obtained by the electronic wave signal of the output signal 101 being reflected and scattered by at least one object around the electronic device 100. For example, the response signal 102 may be, but is not limited to, an electronic wave signal obtained by the chirp signal being reflected and scattered by the user 250 located around the electronic device 100.

The first radar sensor 190 of FIG. 1A may output, in a general operation mode a radar sensor, a signal, and may receive a response signal corresponding to the output signal. Thus, the first radar sensor 190 may obtain distance information or motion information about an object existing on the outside, based on the response signal.

Figure 1B:
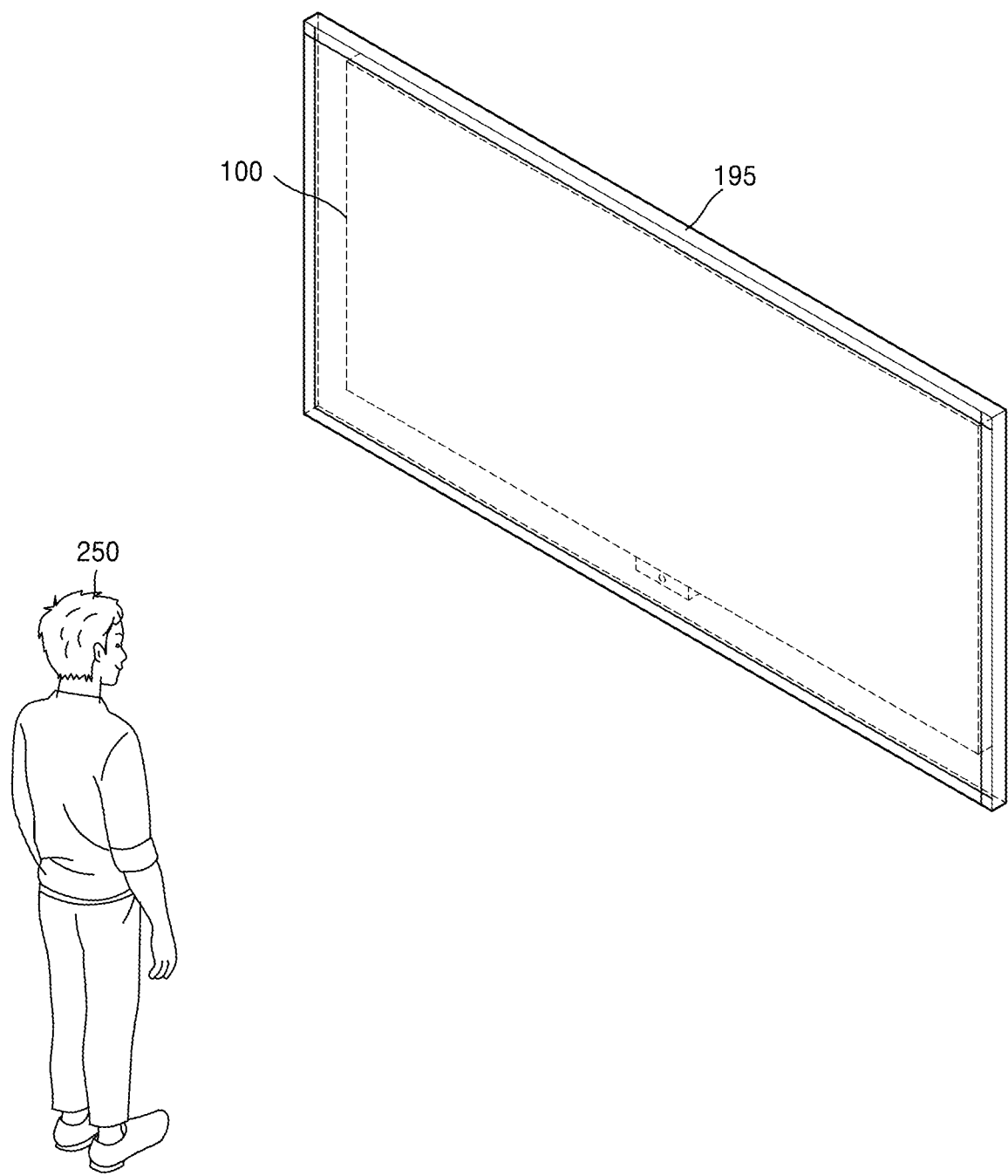
FIG. 1B is a diagram illustrating an example electronic device and a decorative bezel attached to the rim of the electronic device, according to various embodiments.

FIG. 1B is a diagram illustrating an example electronic device and a decorative bezel attached to the rim of the electronic device, according to various embodiments.

A decorative bezel 195 according to an embodiment of the disclosure may be an interior bezel attached to the rim of a television to make the electronic device 100 (particularly, a television) like a picture frame. According to an embodiment of the disclosure, the decorative bezel 195 may have any of various shapes and any of various sizes. To correspond to the various shapes of the electronic device 100, the decorative bezel 195 may have various shapes, and the width and thickness of the decorative bezel 195 are not limited to a particular width and thickness. The decorative bezel 195 may also be formed of any of various materials. The material of the decorative bezel 195 may be wood or glass, but is not limited thereto like a general picture frame. According to widths, thicknesses, and materials of the decorative bezel 195, a sensing range of the first radar sensor 190 of the electronic device 100 located on a rear surface of the decorative bezel 195 may be limited.

The first radar sensor 190 of FIG. 1A may output a signal by operating in a general operation mode of a radar sensor, but may not receive a valid response signal corresponding to the output signal. Thus, the first radar sensor 190 may not obtain information (e.g., distance information or motion information) about an object existing on the outside, based on the response signal when the decorative bezel 195 is present.

Figure 1C:
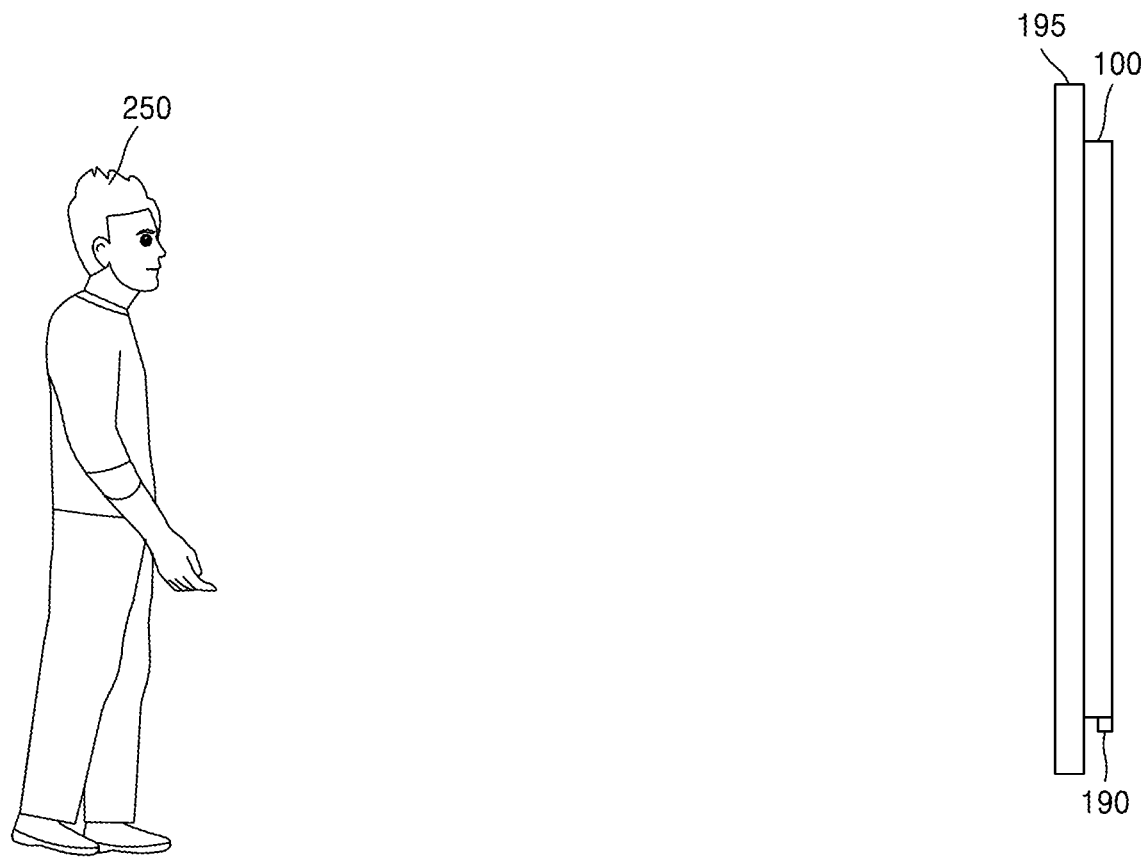
FIG. 1C is a diagram illustrating an example operation mode of a first radar sensor of an electronic device when a decorative bezel is attached to the electronic device, according to various embodiments.

FIG. 1C is a diagram illustrating an example operation mode of a first radar sensor of an electronic device when a decorative bezel is attached to the electronic device, according to various embodiments.

The decorative bezel 195 according to an embodiment of the disclosure may be attached to a front surface of the electronic device 100 and thus may restrict the sensing range of the first radar sensor 190. The decorative bezel 195 may be attached to the rim of the electronic device 100 and thus may restrict the sensing range of the first radar sensor 190. As the sensing range of the first radar sensor 190 is restricted, a receiver 193 of the first radar sensor 190 may not receive a valid response signal from the at least one object located in the vicinity of the electronic device 100 (for example, in a front surface direction of the electronic device 100). For example, the first radar sensor 190 may not effectively sense the at least one object located around the electronic device 100.

Figure 1D:
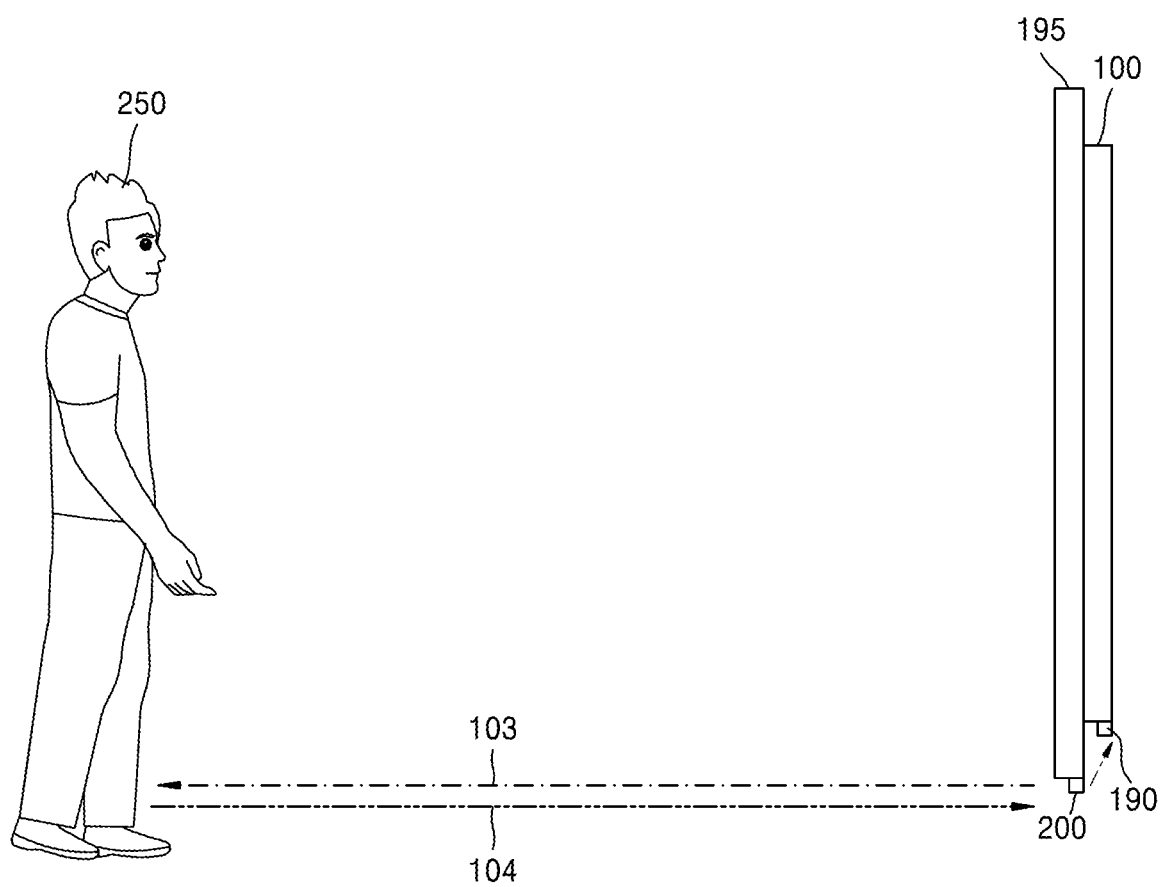
FIG. 1D is a diagram illustrating an example operation mode of a first radar sensor of an electronic device and an example operation mode of a second radar sensor of the electronic device when a decorative bezel is attached to the electronic device, according to various embodiments.

FIG. 1D is a diagram illustrating an example operation mode of a first radar sensor of an electronic device and an operation mode of a second radar sensor of the electronic device when a decorative bezel is attached to the electronic device, according to various embodiments.

A second radar sensor 200 according to an embodiment of the disclosure may calculate a location, a direction, a distance, an angle, and the like of a sensed object (for example, the user 250), based on an output signal 103 and a response signal 104.

The second radar sensor 200 according to an embodiment of the disclosure may be disposed on a decorative bezel 195 and be capable of exchanging signals with the first radar sensor 190 of the electronic device 100. The second radar sensor 200 may be disposed on a location on a decorative bezel 195 that corresponds to a location of the first radar sensor 190 of the electronic device 100. For example, when a first radar sensor is disposed at the center of a bottom surface of an electronic device, the second radar sensor 200 may be attached to the center of a bottom surface of the decorative bezel 195, but embodiments are not limited thereto.

The first radar sensor 190 according to an embodiment of the disclosure may obtain information about the user 250 through the second radar sensor 200, even when the user 250 cannot be sensed by the decorative bezel 195. For example, the first radar sensor 190 may receive a chirp signal generated based on a signal corresponding to a result of sensing of the user 250 by the second radar sensor 200, and may obtain at least one of location information and motion information about the user 250. For example, the location information may include distance information between the electronic device 100 and the user 205 around the electronic device 100 and angle information between the user 205 and the electronic device 100, and the motion information may include speed information of the user 250.

Specifications of the second radar sensor 200 may be the same as or similar to those of the first radar sensor 190, but embodiments are not limited thereto. The second radar sensor 200 may include a plurality of receivers and a transmitter.

Figure 1E:
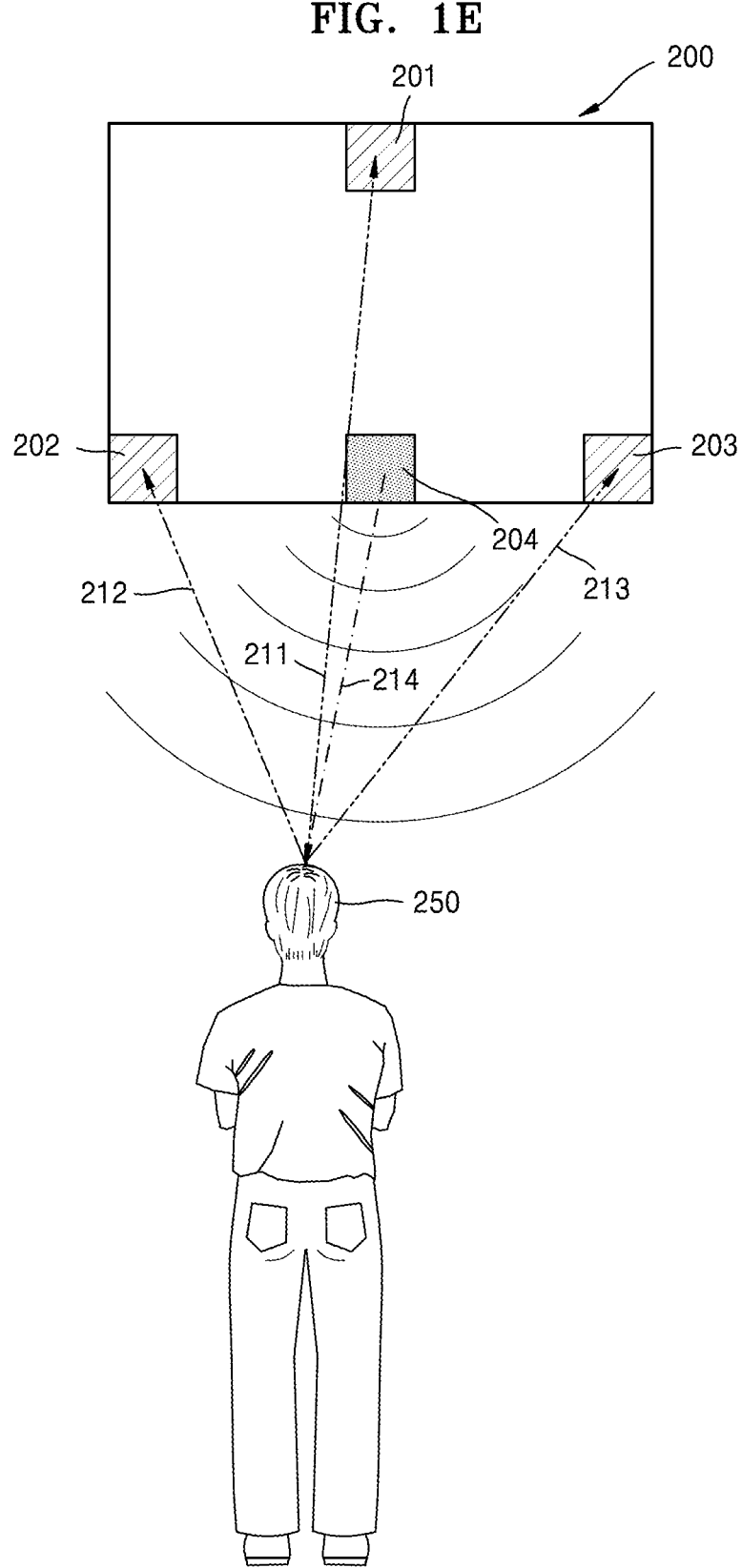
FIG. 1E is a diagram illustrating a plurality of receivers of a second radar sensor according to various embodiments.

FIG. 1E is a diagram illustrating an example of a plurality of receivers of a second radar sensor according to various embodiments.

The second radar sensor 200 according to an embodiment of the disclosure may include a receiver unit including a receiver 1 201, a receiver 2 202, and a receiver 3 203, and a transmitter 204. The second radar sensor 200 may transmit an electronic wave signal 214 via the transmitter 204. The receiver 1 201 of the second radar sensor 200 may receive, as a response signal 1 211, an electronic wave signal obtained by the electronic wave signal 214 being reflected and scattered by the user 250. The receiver 2 202 of the second radar sensor 200 may receive, as a response signal 2 212, an electronic wave signal obtained by the electronic wave signal 214 being reflected and scattered by the user 250. The receiver 3 203 of the second radar sensor 200 may receive, as a response signal 3 213, an electronic wave signal obtained by the electronic wave signal 214 being reflected and scattered by the user 250. Based on the respective phases of the response signal 1 211, the response signal 2 212, and the response signal 3 213, the second radar sensor 200 may calculate an angle between the user 250 and the second radar sensor 200 and a speed of the user 250.

In FIGS. 1A, 1B, 1C, 1D and 1E (which may be referred to as FIGS. 1A through 1E), the first radar sensor and the second radar sensor are terms used to distinguish a radar sensor disposed on an electronic device from a radar sensor disposed on a decorative bezel, and embodiments are not limited thereto. The first radar sensor may be referred to as a radar sensor, the second radar sensor may be referred to as an external radar sensor, and the decorative bezel may be referred to as an interior bezel or an external bezel. The radar sensor may also be referred to as a radar sensor device or a radar sensor module, and embodiments are not limited to a specific radar sensor.

Figure 2A:
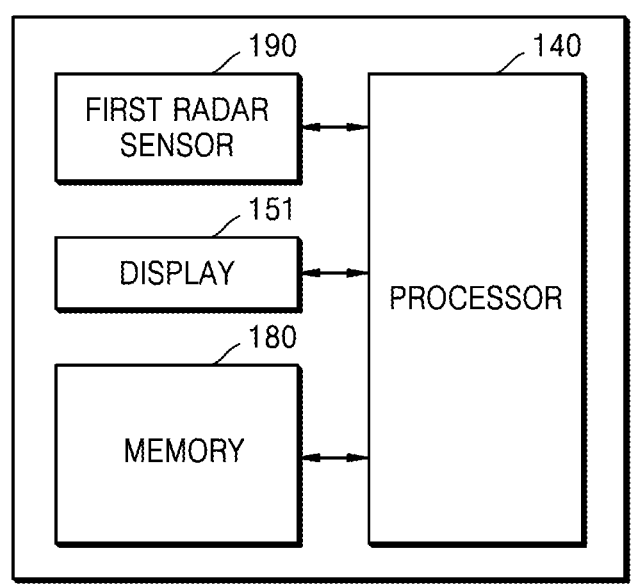
FIG. 2A is a block diagram illustrating an example configuration of an electronic device according to various embodiments.

FIG. 2A is a block diagram illustrating an example configuration of an electronic device according to various embodiments.

Referring to FIG. 2A, the electronic device 100 according to an embodiment of the disclosure may include the first radar sensor (e.g., including radar sensor circuitry) 190, a display 151, a memory 180, and a processor (e.g., including processing circuitry) 140.

The first radar sensor 190 may include various circuitry including, for example, the receiver 193, the transmitter 192, the signal generator 191, and a modulator 194 (refer to FIG. 2C and the description thereof below).

The signal generator 191 according to an embodiment of the disclosure may generate a chirp signal, and the transmitter 192 may output the generated chirp signal. For example, the transmitter 192 may output the chirp signal to sense at least one object located around an electronic device. The receiver 193 according to an embodiment of the disclosure may receive a response signal corresponding to the output chirp signal, and may also receive the chirp signal. For example, the receiver 193 may receive the response signal from an external source in correspondence with a third chirp signal in order to sense at least one object located around an electronic device. The receiver 193 may receive a chirp signal output by the second radar sensor 200. The modulator 194 may include a mixer (not shown), a synthesizer (not shown), an analog to digital converter (ADC) (not shown), and a serial peripheral interface (SPI) (not shown). The modulator 194 according to an embodiment of the disclosure may generate a second chirp signal transmitted by the first radar sensor 190, and may modulate a first chirp signal into the second chirp signal so that the second chirp signal corresponds to serial data generated by the second radar sensor 200.

The display 151 may include, for example, and without limitation, at least one of a liquid crystal display (LCD), a thin film transistor-liquid crystal display (TFT-LCD), an organic light-emitting diode (OLED), a flexible display, a three-dimensional (3D) display, and an electrophoretic display. According to an embodiment of the disclosure, when the at least one object located around the electronic device 100 is located in a search range of the electronic device 100, the electronic device 100 may output, to the display 151, a message including information about the at least one object.

The memory 180 may store a program for processing and controlling the processor 140. The memory 180 according to an embodiment of the disclosure may store one or more instructions.

The processor 140 may include various processing circuitry and control the overall operation of the electronic device 100, and may control an operation of the electronic device 100 by executing the one or more instructions stored in the memory 180. The processor 140 according to an embodiment of the disclosure may control the receiver 193 of the first radar sensor 190 to receive the first chirp signal, and may control to change an operation mode of the first radar sensor 190 from a detection mode to a reception mode, based on the received first chirp signal. According to the change in the operation mode of the first radar sensor 190 to the reception mode, the processor 140 may also control the receiver 193 of the first radar sensor 190 to receive the second chirp signal generated by the second radar sensor 200.

The processor 140 according to an embodiment of the disclosure may control the operation mode of the first radar sensor 190 to be changed from a detection mode to a reception mode, when an average intensity of the first chirp signal during a preset first cycle is equal to or greater than a preset (e.g., specified) first threshold. The processor 140 may control the operation mode of the first radar sensor 190 to be changed from the reception mode to the detection mode, when an average intensity of the first chirp signal during a preset second cycle is less than or equal to a preset second threshold. The processor 140 may control the third chirp signal of the first radar sensor 190 to be synchronized with the first chirp signal received from the second radar sensor 200. The processor 140 may control a second intermediate frequency signal to be generated based on the synchronized third chirp signal of the first radar sensor 190 and the second chirp signal generated by the second radar sensor 200, and control information about the at least one object to be obtained based on the second intermediate frequency signal.

The processor 140 according to an embodiment of the disclosure may control the communicator 160 (refer to FIG. 2B) to transmit the information about the at least one object located around the electronic device 100 to an external electronic device. The processor 140 may control the brightness of the display 151, based on whether the at least one object is located within a first search range of the electronic device 100. When the at least one object is located within a second search range of the electronic device 100, the processor 140 may control a message including the information about the at least one object to be output to the display 151 of the electronic device 100.

However, all of the illustrated components are not essential. The electronic device 100 may be implemented by more or less components than those illustrated in FIG. 2A. For example, as shown in FIG. 2B, the electronic device 100 according to an embodiment of the disclosure may include a broadcasting receiver 110, a user interface unit 120, an external apparatus interface unit 130, a processor 140, an output interface 150, a communication interface 160, a sensing unit 170, and a memory 180.

Figure 2B:
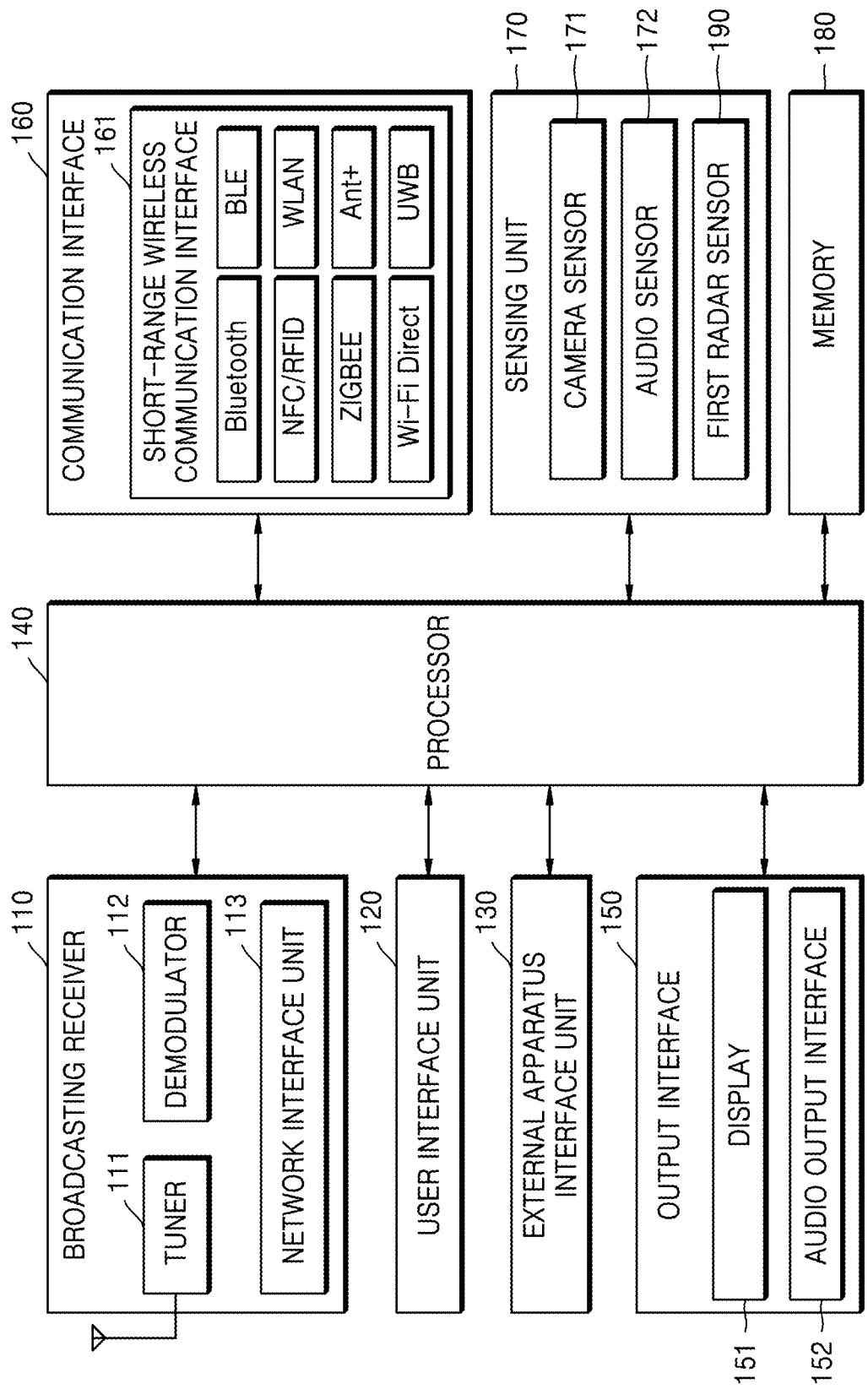
FIG. 2B is a block diagram illustrating an example configuration of an electronic device according to various embodiments.

FIG. 2B is a block diagram illustrating an example configuration of an electronic device according to various embodiments.

The electronic device 100 according to an embodiment of the disclosure may include the broadcasting receiver 110, the user interface unit (e.g., including user interface circuitry) 120, the external apparatus interface unit (e.g., including interface circuitry) 130, the processor (e.g., including processing circuitry) 140, the output interface (e.g., including interface circuitry) 150, the communication interface (e.g., including communication circuitry) 160, the sensing unit (e.g., including at least one sensor) 170, and the memory 180. The aforementioned components will now be described in greater detail below with reference to the figure.

The broadcasting receiver 110 may include a tuner 111, a demodulator 112, and a network interface unit (e.g., including network interface circuitry) 113. The broadcasting receiver 110 may include the tuner 111 and the demodulator 112 and may not include the network interface unit 113, or vice versa. Although not shown in FIG. 2B, the broadcasting receiver 110 may include a multiplexer to multiplex a signal demodulated by the tuner 111 and the demodulator 112 and a signal received via the network interface unit 113. Although not shown in FIG. 2B, the broadcasting receiver 110 may also include a demultiplexer.

The tuner 111 tunes a channel selected by a user or all stored channels and receive a radio frequency (RF) broadcasting signal corresponding to the tuned channel(s) from among RF broadcasting signals received via an antenna. The tuner 111 may transform the received RF broadcasting signal into an intermediate frequency (IF) signal or a baseband signal.

For example, when the received RF broadcasting signal is a digital broadcasting signal, it may be transformed into a digital IF signal, and, when the received RF broadcast signal is an analog broadcast signal, it may be transformed into an analog baseband video or audio signal. The tuner 111 may receive an RF broadcasting signal of a single carrier or multiple carriers. The tuner 111 may sequentially tune and receive RF broadcasting signals of all broadcasting channels stored via a channel memorize function from among the RF broadcasting signals received via the antenna, and may transform the selected RF broadcast signal into an IF signal or a baseband video or audio signal.

The demodulator 112 may receive and demodulate the digital IF signal obtained by the tuner 111, and may perform channel decoding or the like. The demodulator 112 may include a Trellis decoder, a de-interleaver, a Reed-Solomon decoder, etc., or may include a convolution decoder.

The demodulator 112 may perform demodulation and channel decoding to output a stream signal. The stream signal may be a signal obtained by multiplexing a video signal, an audio signal, or a data signal. For example, the stream signal may be a video signal following the MPEG-2 standard.

The stream signal output by the demodulator 112 may be input to the processor 140. The processor 140 may control demultiplexing, video and audio signal processing, etc., and may control video output through the display 151 and audio output through the audio output interface 152.

The network interface unit 113 may include various circuitry that provides an interface for connecting the electronic device 100 to a wired/wireless network including an Internet network. The network interface unit 113 may include, for example, an Ethernet terminal, for connection with a wired network, and may use, for example, wireless LAN (WLAN), Wi-Fi, wireless broadband (Wibro), World Interoperability for Microwave Access (Wimax), and high speed downlink packet access (HSDPA) communication standards, for connection with a wireless network.

The network interface unit 113 may transmit or receive data to or from another user or another electronic device via a connected network or another network linked with the connected network. In particular, the network interface unit 113 may transmit a portion of the data stored in the electronic device 100 to another user selected from pre-registered other users or another electronic device selected from pre-registered other electronic devices.

The network interface unit 113 may be connected to a certain webpage via the connected network or the other network linked with the connected network. The network interface unit 113 may be connected to a network to transmit or receive data to or from a corresponding server. The network interface unit 113 may also receive content or data provided by a content provider and a network operator. In other words, the network interface unit 113 may receive content, such as a movie, an advertisement, a game, a VOD, and a broadcasting signal, and information related to the content from the content provider or the network operator through the network. The network interface unit 113 may also receive update information and an update file of firmware provided by the network operator. The network interface unit 113 may also may transmit data to the Internet, the content provider, or the network operator. The network interface unit 113 may select and receive a desired application from among applications published through the network.

The user interface unit 120 may include various user interface circuitry and transmits a signal corresponding to an input by the user to the processor 140 or transmits a signal of the processor 140 to the user. For example, the user interface unit 120 may process control signals such as power on/off, channel selection, and screen setting from a remote control device are received and processed (not shown) according to various communication methods such as an RF communication method and an infrared communication method or a control signal of the processor 140 is transmitted to the remote control device. The user interface unit 120 may transmit, the processor 140, a control signal input by the sensing unit 190 sensing a gesture of the user, or may transmit the signal of the processor 140 to the sensing unit 170.

The external apparatus interface unit 130 may include various interface circuitry and provides an interface environment between the electronic device 100 and various external devices. The external apparatus interface unit 130 may include an audio/video (A/V) input/output interface. The external apparatus interface 130 may be connected to an external apparatus, such as a digital versatile disk (DVD), a Blu ray, a game player, a camera, a camcorder, a computer, or an air-conditioner, by wire or wirelessly. The external apparatus interface unit 130 transmits a signal including data such as an image, video, and voice input through a connected external apparatus to the processor 140 of the electronic device 100. The processor 140 may control processed data signals, such as images, video, and audio, to be output to the connected external device. The A/V input/output unit may include a USB port, a Composite Video Banking Sync (CVBS) port, a component port, an S-video port (analog), a digital visual interface (DVI) port, a High Definition Multimedia Interface (HDMI) port, an RGB port, a D-SUB port, and the like to input video and audio signals of an external device to the electronic device 100.

The processor 140 may include various processing circuitry and typically controls all operations of the electronic device 100. For example, the processor 140 may control the broadcasting receiver 110, the user interface unit 120, the external apparatus interface unit 130, the output interface 150, the communication interface 160, the sensing unit 170, and the memory 180, by executing the programs stored in the memory 180.

According to an embodiment of the disclosure, the processor 140 may include, but is not limited to, an artificial intelligence (AI) processor for generating a learning network model. According to an embodiment of the disclosure, the AI processor may be realized as a chip separate from the processor 140. According to an embodiment of the disclosure, the AI processor may be a general-use chip.

According to an embodiment of the disclosure, the processor 140 may change the operation mode of the first radar sensor 190 of the electronic device 100 from the detection mode to the reception mode, based on the first chirp signal generated by the second radar sensor 200. According to an embodiment of the disclosure, when the average intensity of the first chirp signal received during the preset first cycle is equal to or greater than the preset first threshold, the processor 140 may change the operation mode of the first radar sensor 190 from the detection mode to the reception mode. According to an embodiment of the disclosure, when the average intensity of the first chirp signal received during the preset second cycle is less than or equal to the preset second threshold, the processor 140 may change the operation mode of the first radar sensor 190 from the reception mode to the detection mode. An operation of changing the operation mode of the first radar sensor 190, based on the intensity of the received first chirp signal will be described later in detail with reference to FIG. 5.

According to an embodiment of the disclosure, the processor 140 may control such that the operation mode of the first radar sensor 190 from the detection mode to the reception mode, is changed based on the first chirp signal output by the second radar sensor 200. The processor 140 may control the third chirp signal of the first radar sensor 190 to be synchronized with the first chirp signal, and may control the second intermediate frequency signal to be generated, based on the third chirp signal of the first radar sensor 190 and the second chirp signal of the second radar sensor 200. An operation, performed by the processor 140, of obtaining information (for example, location information or motion information) about the at least one object located around the electronic device 100, based on the second intermediate frequency signal, will be described later with reference to FIG. 7.

The output interface 150 may include various output circuitry and outputs an audio signal or a video signal. The output interface 150 may include the display 151 and the audio output interface 152.

When the display 151 forms a layer structure together with a touch pad to construct a touch screen, the display 151 may be used as an input device as well as an output device. The display 151 may include at least one of a liquid crystal display (LCD), a thin film transistor-liquid crystal display (TFT-LCD), an organic light-emitting diode (OLED), a flexible display, a three-dimensional (3D) display, and an electrophoretic display. According to embodiments of the electronic device 100, the electronic device 100 may include at least two displays 151.

The audio output interface 152 may receive a signal audio-processed by the processor 140, for example, a stereo signal, and may output the received signal as sound. The audio output interface 152 may be implemented as any of various types of speakers.

The communication interface 160 may include one or more components including various communication circuitry that enable communication between the electronic device 100 and a server device (not shown) and communication between the electronic device 100 and a mobile terminal (not shown). For example, the communication interface 160 may include a short-range wireless communication unit (e.g., including various short range communication circuitry) 161.

Examples of the short-range wireless communication interface 161 may include, but are not limited to, a Bluetooth communication interface, a Bluetooth Low Energy (BLE) communication interface, a near field communication (NFC) interface, a wireless local area network (WLAN) (e.g., Wi-Fi) communication interface, a ZigBee communication interface, an infrared Data Association (IrDA) communication interface, a Wi-Fi direct (WFD) communication interface, an ultra wideband (UWB) communication interface, and an Ant+ communication interface.

According to an embodiment of the disclosure, the communication interface 160 may transmit the information about the at least one object located around the electronic device 100 to an external electronic device, a mobile terminal (not shown) of the user, or a server device (not shown).

The electronic device 100 may obtain the information about the at least one object located around the electronic device 100 from the external electronic device, the mobile terminal (not shown) of the user, or the server device (not shown).

The sensing unit 170 may include various sensors including, for example, and without limitation, a camera sensor 171, an audio sensor 172, and the first radar sensor 190, but embodiments are not limited thereto. As charge coupled device (CCD) and complementary metal oxide semiconductor (CMOS) technologies develop, the camera sensor 171 of the electronic device 100 may obtain high-quality image or video information. Based on the image or video information, information such as the type, size, movement direction, and location of the at least one object located around the electronic device 100 may be recognized. The audio sensor 172 may include, but is not limited to, a microphone. The audio sensor 172 may be used as an input device for recognizing a user's voice.

The first radar sensor 190 may be a sensor that measures the direction, distance, speed, etc. of a sensed object by transmitting an electromagnetic wave and measuring a reflected wave returning by colliding with the object. The shape of the first radar sensor 190 may include various radars such as a mechanical radar, a phased array radar, a passive electronically scanned array, PESA, and an active electronically scanned array, AESA, but embodiments are not limited thereto. The shape of the first radar sensor 190 may also include a one-dimensional radar, a two-dimensional radar, or a three-dimensional radar according to reception information of the first radar sensor 190, but embodiments are not limited thereto. A structure of the first radar sensor 190 will be described later in more detail with reference to FIG. 2C.

The memory 180 may store a program for processing and control by the processor 140, and may also store pieces of input/output data (for example, (e.g., a first threshold, a second threshold, a first cycle, a second cycle, a third cycle, a first search range, and a second search range).

The memory 180 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk. The programs stored in the memory 180 may be classified into a plurality of modules according to their functions.

The electronic device 100 may further include a power supply (not shown). The power supply may supply power to the components of the electronic device 100, under the control by the processor 140. The power supply may supply power received from an external power source via a power code to each of the components of the electronic device 100, under the control by the processor 140.

Figure 2C:
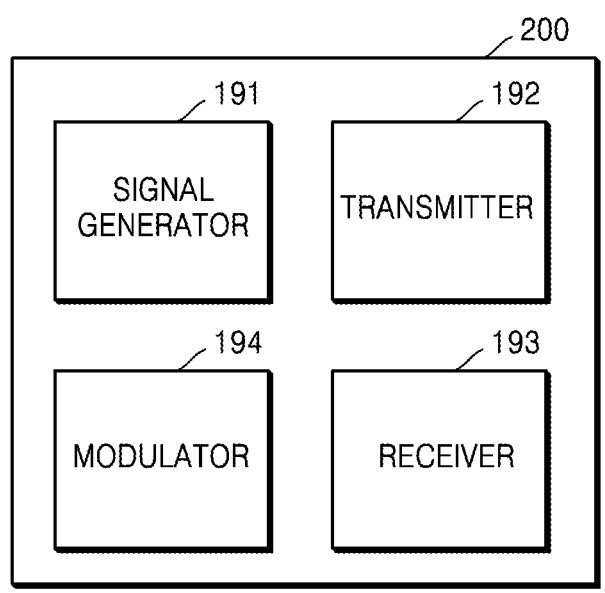
FIG. 2C is a block diagram illustrating an example configuration of a first radar sensor of an electronic device according to various embodiments.

FIG. 2C is a block diagram illustrating an example configuration of a first radar sensor of an electronic device according to various embodiments. Referring to FIG. 2C, the first radar sensor 190 according to an embodiment of the disclosure may include the signal generator 191, the transmitter 192, the receiver 193, and the modulator 194.

The signal generator 191 may include various circuitry and perform a function of generating a chirp signal whose frequency and phase continuously change with time. The signal generator 191 included in the first radar sensor 190 of the electronic device 100 according to an embodiment of the disclosure may generate the chirp signal, and the generated chirp signal may be output by the transmitter 192 to sense the at least one object located around the electronic device 100.

The transmitter 192 and the receiver 193 may perform a function of transmitting or receiving a signal. According to an embodiment of the disclosure, the transmitter 192 and the receiver 193 of the first radar sensor 190 may transmit or receive the chirp signal. For example, the transmitter 192 may transmit the third chirp signal, and the receiver 193 may receive the first chirp signal and the second chirp signal and may receive a second response signal from an external source in correspondence with the third chirp signal.

The modulator 194 may include various circuitry including, for example, and without limitation, a mixer (not shown), a synthesizer (not shown), an analog to digital converter (ADC) (not shown), and a serial peripheral interface (SPI) (not shown). The synthesizer may include a phase-locked loop and a voltage controlled oscillator. The phase-locked circuit may control an output signal using a phase difference between an input signal and a signal fed back from the output signal, and the voltage-controlled generator may generate a variable frequency proportional to an input control voltage. According to an embodiment of the disclosure, the third chirp signal of the first radar sensor 190 may be modulated by the phase locked circuit and the voltage controlled oscillator of the modulator 194.

According to an embodiment of the disclosure, an operation of changing the operation mode of the first radar sensor 190 from the detection mode to the reception mode may include an operation of synchronizing the third chirp signal of the first radar sensor 190 with the first chirp signal of the second radar sensor 200. For example, when the operation mode of the first radar sensor 190 is the reception mode, the first chirp signal received through the receiver 193 may be input to the modulator 194. The modulator 194 may modulate the third chirp signal to be synchronized with the first chirp signal, and may output the synchronized third chirp signal.

The modulator 194 may convert an analog signal received by the receiver 193 into a digital signal through the ADC, and may input the digital signal to the SPI to obtain serial data (serial digital data). A microcontroller unit (MCU) (not shown) inside or outside the first radar sensor 190 may generate a complex matrix by performing range fast Fourier transform and angular fast Fourier transform on the input serial data. The MCU inside or outside the first radar sensor 190 may obtain a distance, an angle, and a speed of the at least one object located around the electronic device 100, based on the generated complex matrix.

The first radar sensor 190 may include a special communication interface (not shown). Even when the first radar sensor 190 includes no special communication interfaces, the first radar sensor 190 may transmit or receive a signal and data to or from another electronic device (not shown) and a server (not shown) through the communication interface 160 of the electronic device 100. The first radar sensor 190 may include a plurality of first radar sensors.

Figure 2D:
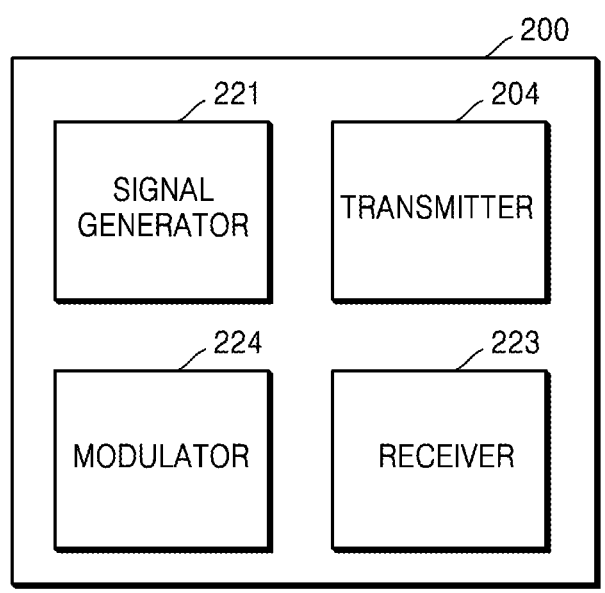
FIG. 2D is a block diagram illustrating an example configuration of a second radar sensor located outside an electronic device according to various embodiments.

FIG. 2D is a block diagram illustrating an example configuration of a second radar sensor located outside an electronic device according to various embodiments. Referring to FIG. 2D, the second radar sensor 200 according to an embodiment of the disclosure may include a signal generator 221, a transmitter 204, a receiver 223, and a modulator 224. Referring to FIG. 1E, the receiver 223 may include a plurality of receivers including the receiver 1 201, the receiver 2 202, and the receiver 3 203.

The signal generator 221 may perform a function of generating a chirp signal whose frequency and phase continuously change with time. The signal generator 221 included in the second radar sensor 200 according to an embodiment of the disclosure may generate the chirp signal, and the generated chirp signal may be output by the transmitter 204 to sense the at least one object located around the electronic device 100.

The transmitter 204 and the receiver 223 may perform a function of transmitting or receiving a signal. According to an embodiment of the disclosure, the transmitter 204 and the receiver 223 of the second radar sensor 200 may transmit or receive the chirp signal. For example, the transmitter 204 may transmit the first chirp signal and the second chirp signal, and the receiver 223 may receive a first response signal from an external source in correspondence with the first chirp signal.

The modulator 224 may include a mixer (not shown), a synthesizer (not shown), an analog to digital converter (ADC) (not shown), and a serial peripheral interface (SPI) (not shown). The synthesizer may include a phase-locked loop and a voltage controlled oscillator. The phase-locked circuit may control an output signal using a phase difference between an input signal and a signal fed back from the output signal, and the voltage-controlled generator may generate a variable frequency proportional to an input control voltage.

The modulator 224 may convert an analog signal received by the receiver 223 into a digital signal through the ADC, and may input the digital signal to the SPI to obtain serial data (serial digital data). An MCU (not shown) inside or outside the second radar sensor 200 may generate a complex matrix by performing range fast Fourier transform and angular fast Fourier transform on the input serial data. The MCU inside or outside the second radar sensor 200 may obtain a distance, an angle, and a speed of the at least one object located around the electronic device 100, based on the generated complex matrix. A detailed operation of the second radar sensor 200 will be described later in more detail with reference to FIG. 6.

The second radar sensor 200 according to an embodiment of the disclosure may be disposed on the decorative bezel 195 capable of exchanging signals with the first radar sensor 190 of the electronic device 100. The second radar sensor 200 may be disposed on the location on a decorative bezel 195 that corresponds to a location of the first radar sensor 190 of the electronic device 100. For example, when a first radar sensor is disposed at the center of a bottom surface of an electronic device, the second radar sensor 200 may be attached to the center of the bottom surface of the decorative bezel 195, but embodiments are not limited thereto.

The second radar sensor 200 according to an embodiment of the disclosure may be a first radar sensor having the same or similar specifications as the first radar sensor 190, but embodiments are not limited thereto. The second radar sensor 200 may include a plurality of radar sensors, and the second radar sensor 200 may include no special communication interfaces. The second radar sensor 200 may represent a radar sensor device for radar signal transmission/reception.

FIG. 3A is a diagram illustrating an example detection mode of a first radar sensor of an electronic device according to various embodiments.

The detection mode of the first radar sensor 190 is an operation mode in which the transmitter 192 of the first radar sensor 190 outputs a third chirp signal 301 and the receiver 193 of the first radar sensor 190 receives a second response signal 302 from an external source in correspondence with the outputting of the third chirp signal 301. For example, in the detection mode of the first radar sensor 190, the third chirp signal 301 may be output in a front side direction of the electronic device 100. Because the decorative bezel 195 is not attached to the electronic device 100 of FIG. 3A, the electronic device 100 may receive a valid second response signal 302 from the user 250. In detail, the valid second response signal 302 may be an electronic wave signal obtained by the user 250 in front of the electronic device 100 reflecting and scattering the output third chirp signal 301.

FIG. 3B is a diagram illustrating an example detection mode of a first radar sensor of an electronic device to which a decorative bezel has been attached, according to various embodiments.

The decorative bezel 195 detachable from the electronic device 100 may be attached to the rim of the electronic device 100. According to sizes and materials of the decorative bezel 195, a sensing range of the first radar sensor 190 located on the rear surface of the decorative bezel 195 may be limited. According to sizes and materials of the decorative bezel 195, the first radar sensor 190 may not receive a valid response signal. For example, in FIG. 3B, it may be difficult for the first radar sensor 190 to effectively sense the user 250 located in front of the electronic device 100.

Figure 3C:
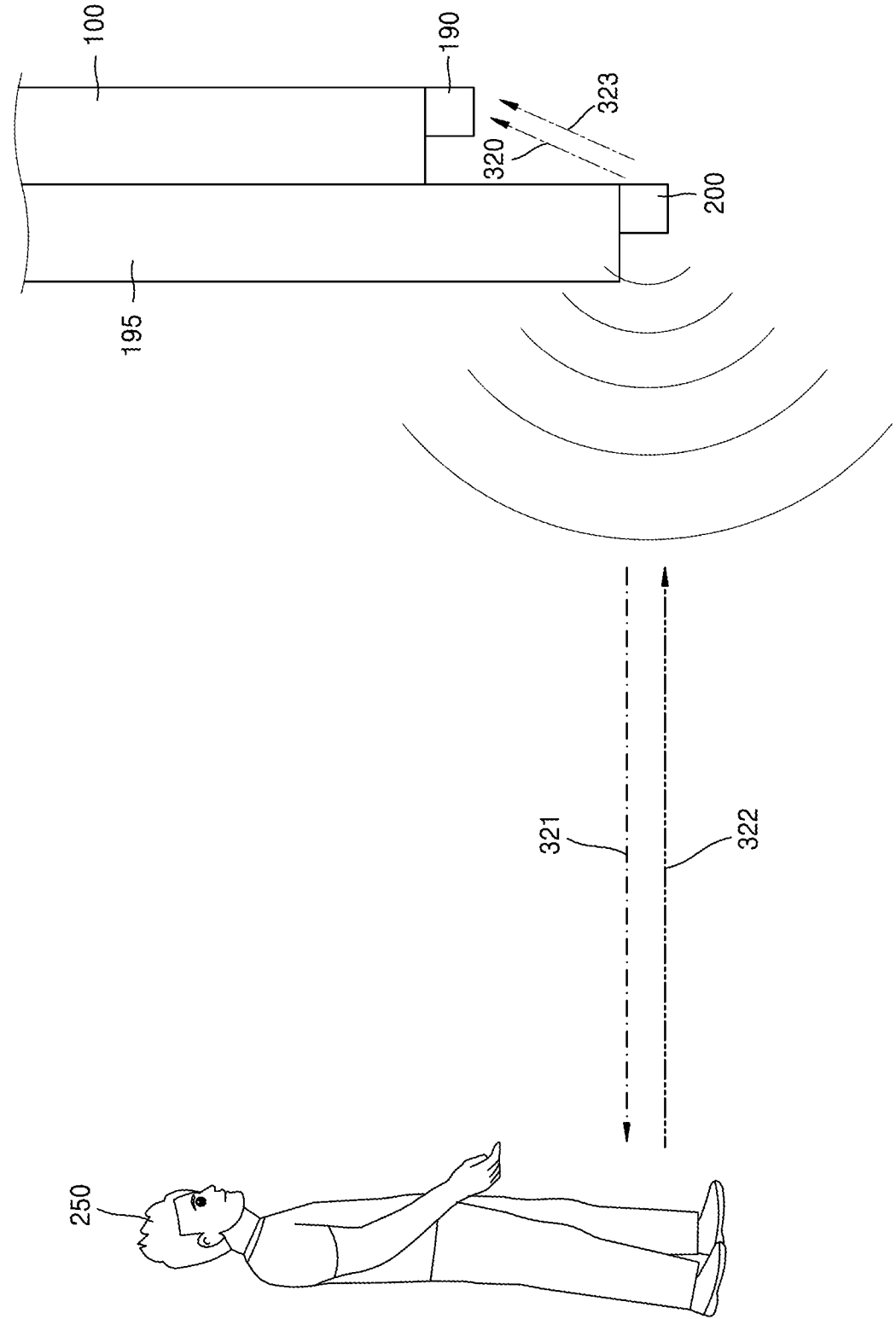
FIG. 3C is a diagram illustrating an example reception mode of a first radar sensor of an electronic device when a decorative bezel and a second radar sensor are attached to the electronic device, according to various embodiments.

FIG. 3C is a diagram illustrating an example reception mode of a first radar sensor of an electronic device when a decorative bezel and a second radar sensor are attached to the electronic device, according to various embodiments.

When it is difficult for the first radar sensor 190 to effectively sense the user 250 located in front of the electronic device 100, the second radar sensor 200 may be attached to the decorative bezel 195 and be capable of signal exchange with the first radar sensor 190.

The second radar sensor 200 may operate in the detection mode to output the first chirp signal to both a front surface and a rear surface of the second radar sensor 200. The first chip signal output to the front surface of the second radar sensor 200 is depicted as signal 321 in FIG. 3C; the first chip signal output to the rear surface of the second radar sensor 200 is depicted as signal 320 in FIG. 3C. A response to the first chip signal 321 is depicted as signal 322 in FIG. 3C. The processor 140 may control the operation mode of the first radar sensor 190 to change from the detection mode to the reception mode, based on a first chirp signal 320 of the second radar sensor 200, and the first radar sensor 190 may operate in the reception mode.

The reception mode according to an embodiment of the disclosure may be an operation mode of obtaining the information about the at least one object, based on the second chirp signal received from the second radar sensor 200. For example, the reception mode of the first radar sensor 190 may include an operation, performed by the receiver 193 of the first radar sensor 190, of receiving a second chirp signal 323. In the reception mode of the first radar sensor 190, the third chirp signal of the first radar sensor 190 may be synchronized with the first chirp signal 320 of the second radar sensor 200, and a second intermediate frequency signal may be generated based on the synchronized third chirp signal and the second chirp signal 323. A detailed operation of the first radar sensor 190 will be described later in more detail with reference to FIG. 8C.

The first radar sensor 190 according to an embodiment of the disclosure may operate in the detection mode or the reception mode, and may adaptively change the operation mode of the first radar sensor 190. For example, the operation mode of the first radar sensor 190 may be changed from the detection mode to the reception mode, based on a first chirp signal 320 of the second radar sensor 200. Because the intensity of the output chirp signal is much greater than the intensity of the response signal received from an external source in response to the outputting of the chirp signal, the processor 140 may control to the operation mode of the first radar sensor 190 to be changed or kept, based on the intensity of the received signal. A detailed method of changing and keeping the operation mode of the first radar sensor 190 will be described later in more detail with reference to FIG. 5.

In FIGS. 3A, 3B and 3C, the detection mode and the reception mode of the first radar sensor 190 are terms used to distinguish operation modes of the first radar sensor 190 from each other, and embodiments are not limited thereto. The detection mode may be referred to as a sensing mode, and the reception mode may be referred to as a communication mode.

FIG. 4 is a flowchart illustrating an example radar signal transmission/reception method of changing an operation mode of a first radar sensor, based on a first chirp signal of a second radar sensor, according to various embodiments.

In operation S401, the electronic device 100 according to an embodiment of the disclosure may receive a first chirp signal output by the second radar sensor, which is outside the electronic device 100.

The first radar sensor 190 of the electronic device 100 according to an embodiment of the disclosure may receive the first chirp signal from the second radar sensor 200, which is outside the electronic device 100. In detail, the receiver 193 of the first radar sensor 190 may receive the first chirp signal from the second radar sensor 200 always operating in the detection mode. For example, the first chirp signal generated by the second radar sensor 200 may include a plurality of chirp waveforms in which a frequency periodically changes from 60 GHZ to 64 GHZ during a second time (for example, 24.576 ms) within a first time (for example, 100 ms). For example, each of the chirp waveforms may have a length of 0.384 ms, and the plurality of chirp waveforms may include 64 chirp waveforms.

In operation S403, the electronic device 100 according to an embodiment of the disclosure may change the operation mode of the first radar sensor from the detection mode to the reception mode, based on the first chirp signal.

According to an embodiment of the disclosure, the processor 140 may control the operation mode of the first radar sensor to be changed from the detection mode to the reception mode, based on the first chirp signal. For example, when an average intensity of the first chirp signal received during a preset first cycle is equal to or greater than a preset first threshold, the processor 140 may control the operation mode of the first radar sensor 190 to be changed from the detection mode to the reception mode. For example, the preset first threshold and the preset first cycle may be determined based on data regarding the intensity of a received electronic wave signal stored in the memory 180. The intensity of the first chirp signal output by the first radar sensor 190 in the reception mode may be much greater than a response signal corresponding to the chirp signal output in the detection mode (for example, a second response signal). Based on the data regarding the intensity of the received electronic wave signal stored in the memory 180, the processor 140 may determine the preset first threshold and the preset first cycle, which are for determining whether the received electronic wave signal is the first chirp signal output by the first radar sensor 190 or the response signal corresponding to the output chirp signal. The processor 140 may adaptively change the preset first threshold and the preset first cycle, based on the intensity of the received electronic wave signal stored in the memory 180.

According to an embodiment of the disclosure, the processor 140 may change the operation mode of the first radar sensor 190, based on a signal regarding control of the first radar sensor 190, the signal corresponding to an input by a user. For example, the user interface unit 120 of the electronic device 100 may transmit the signal regarding control of the first radar sensor 190, the signal corresponding to an input by a user, to the processor 140. For example, the signal regarding control of the first radar sensor 190, the signal corresponding to an input by a user, may be a signal regarding the change in the operation mode of the first radar sensor 190 to the reception mode according to attachment of the second radar sensor 200. For example, the signal regarding control of the first radar sensor 190, the signal corresponding to an input by a user, may be a signal regarding a change in the operation mode of the first radar sensor 190 to the detection mode according to detachment of the second radar sensor 200.

According to an embodiment of the disclosure, the processor 140 may determine whether the second radar sensor 200 is located around the electronic device 100, through the sensing unit 170 of the electronic device 100, including the camera sensor 171. For example, when it is determined through the sensing unit 170 that the second radar sensor 200 is located around the electronic device 100, the processor 140 may control the operation mode of the first radar sensor 190 to be changed from the detection mode to the reception mode.

According to an embodiment of the disclosure, when the average intensity of the first chirp signal received during the preset first cycle is equal to or greater than the preset first threshold, the processor 140 may change the operation mode of the first radar sensor 190 from the detection mode to the reception mode. According to an embodiment of the disclosure, when the average intensity of the first chirp signal received during the preset second cycle is less than or equal to the preset second threshold, the processor 140 may change the operation mode of the first radar sensor 190 from the reception mode to the detection mode. The change and maintenance of the operation mode will be described in greater detail below with reference to FIG. 5.

In operation S405, the electronic device 100 according to an embodiment of the disclosure may receive a second chirp signal generated by the second radar sensor, through a receiver of the first radar sensor, according to the change to the reception mode.

The second radar sensor 200 according to an embodiment of the disclosure may receive the first response signal from an external source in correspondence with the outputting of the first chirp signal.

According to an embodiment of the disclosure, the receiver 223 of the second radar sensor 200 may receive the first response signal from an external source in correspondence with the outputting of the first chirp signal. For example, the receiver 223 may receive a first response signal, which is an electronic wave signal reflected and scattered by the at least one object located around the electronic device 100, in correspondence with the outputting of the first chirp signal. For example, the receiver 223 may receive a first response signal, which is an electronic wave signal reflected and scattered by the user 250 located around the electronic device 100.

According to an embodiment of the disclosure, the receiver 223 of the second radar sensor 200 may include a plurality of receivers. The second radar sensor 200 may receive at least one first response signal from the at least one object through the plurality of receivers. For example, the receiver 1 201 of FIG. 1E may not receive a valid first response signal 211 because the receiver 1 201 is covered by the decorative bezel 195, the receiver 2 202 may receive a valid first response signal 212, and the receiver 3 203 may also receive a valid first response signal 213.

According to an embodiment of the disclosure, the second radar sensor 200 may generate the first intermediate frequency signal, based on the first response signal and the first chirp signal. For example, the second radar sensor 200 may generate the first intermediate frequency signal through a mixer, based on the first response signal and the first chirp signal. For example, the second radar sensor 200 may generate a first intermediate frequency signal corresponding to a difference between the first chirp signal and the first response signal, based on the first response signal and the first chirp signal, and a frequency of the first intermediate frequency signal may be proportional to a distance from the at least one object located around the electronic device 100.

According to an embodiment of the disclosure, the second radar sensor 200 may generate serial data corresponding to the first intermediate frequency signal, based on the first intermediate frequency signal. For example, the second radar sensor 200 may generate the serial data through an ADC and an SPI includable in the modulator 224, based on the first intermediate frequency signal, and the serial data may be serial digital data. For example, the generated serial data may be in a bitstream form, and may be stored in a register (not shown) of the second radar sensor 200 and then used to generate the second chirp signal.

According to an embodiment of the disclosure, the second radar sensor 200 may generate the second chirp signal corresponding to the serial data and transmit the second chirp signal to the first radar sensor 190, and the receiver of the first radar sensor 190 may receive the second chirp signal according to the change to the reception mode. For example, the modulator 224 of the second radar sensor 200 may modulate the first chirp signal into the second chirp signal so that the second chirp signal corresponds to the serial data. For example, the first chirp signal may be modulated into the second chirp signal corresponding to the serial data through the phase locked circuit and the voltage controlled oscillator of the modulator 224. A detailed method of generating the second chirp signal will be described later in detail with reference to FIG. 8B.

According to an embodiment of the disclosure, the receiver of the first radar sensor 190 may receive the second chirp signal according to the change to the reception mode. For example, the second radar sensor 200 may output the second chirp signal after outputting the first chirp signal including the plurality of periodically-changing chirp waveforms and before outputting a new first chirp signal. The receiver of the first radar sensor 190 may receive the second chirp signal according to the change to the reception mode. For example, the first chirp signal may include the plurality of chirp waveforms in which a frequency periodically changes from 60 GHZ to 64 GHZ during the second time (for example, 24.576 ms) within the first time (for example, 100 ms). The second chirp signal may be transmitted to the first radar sensor 190 during a time (for example, 75.424 ms) excluding a preset second time within a preset first time.

In operation S407, according to an embodiment of the disclosure, the electronic device 100 may obtain the information about the at least one object located around (e.g., within a specified proximity of) the electronic device, based on the received second chirp signal.

According to an embodiment of the disclosure, the information about the at least one object may include at least one of location information about the at least one object and motion information about the at least one object, the location information may include distance information about a distance between the electronic device and the at least one object located around the electronic device and angle information about an angle between the at least one object and the electronic device, and the motion information may include speed information and motion information of the at least one object. The motion information may be information about a speed and an angular speed of each of body parts such as the hands, feet, and head of the user 250, when the at least one object is the user 250.

Figure 5:
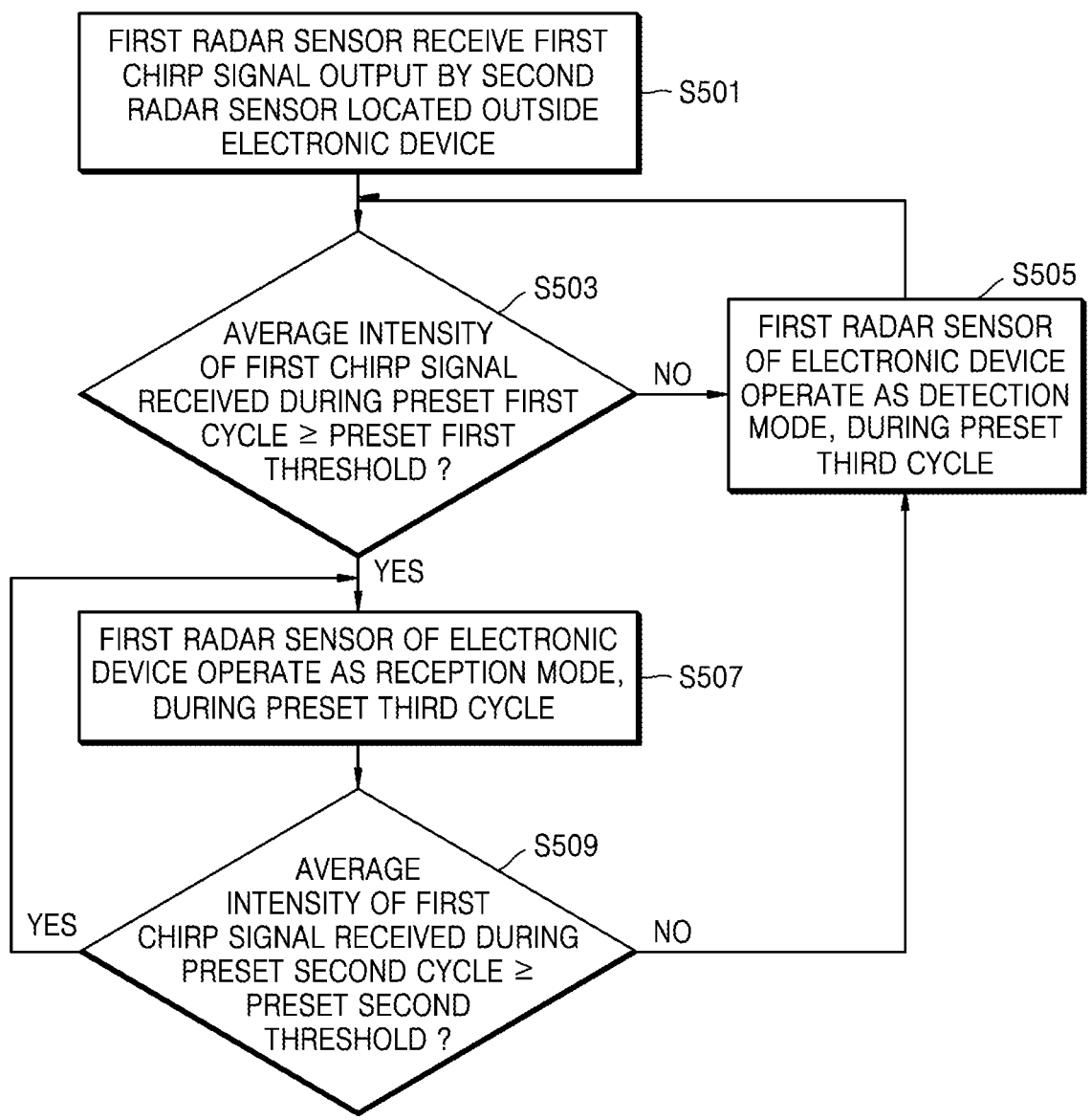
FIG. 5 is a flowchart illustrating an example method of changing or maintaining an operation mode of a first radar sensor of an electronic device according to various embodiments.

FIG. 5 is a flowchart illustrating an example method of changing or maintaining an operation mode of a first radar sensor of an electronic device according to various embodiments.

In operation S501, the electronic device 100 according to an embodiment of the disclosure may receive a first chirp signal output by a second radar sensor that is outside the electronic device 100.

An initial operation mode of the first radar sensor 190 according to an embodiment of the disclosure may be the detection mode. Based on a control signal of a user through the user interface unit 120 or control by the processor 140, the initial operation mode of the first radar sensor 190 may be changed to the reception mode. The initial operation mode of the first radar sensor 190 according to the flowchart of FIG. 5 may be the detection mode.

The processor 140 of the electronic device 100 according to an embodiment of the disclosure may control the first radar sensor 190 to change the operation mode of the first radar sensor 190, based on the intensity of the first chirp signal. In detail, the operation mode of the first radar sensor 190 may be changed from the detection mode to the reception mode, based on the intensity of the first chirp signal, and the operation mode of the first radar sensor 190 may be changed from the reception mode to the detection mode.

According to an embodiment of the disclosure, the processor 140 may control the operation mode of the first radar sensor 190 to be changed from the detection mode to the reception mode, based on the first chirp signal. For example, when the average intensity of the first chirp signal received during the preset first cycle is equal to or greater than the preset first threshold, the processor 140 may control the operation mode of the first radar sensor 190 to be changed from the detection mode to the reception mode. For example, the preset first threshold and the preset first cycle may be determined based on the data regarding the intensity of the received electronic wave signal stored in the memory 180. The intensity of the first chirp signal output by the first radar sensor 190 in the reception mode may be much greater than the response signal corresponding to the chirp signal output in the detection mode (for example, the second response signal). Based on the data regarding the intensity of the received electronic wave signal stored in the memory 180, the processor 140 may determine the preset first threshold and the preset first cycle, which are for determining whether the received electronic wave signal is the first chirp signal output by the first radar sensor 190 or the response signal corresponding to the output chirp signal. The processor 140 may adaptively change the preset first threshold and the preset first cycle, based on the intensity of the received electronic wave signal stored in the memory 180.

According to an embodiment of the disclosure, the processor 140 may control the operation mode of the first radar sensor to be changed from the reception mode to the detection mode, based on the first chirp signal. For example, when the average intensity of the first chirp signal received during the preset second cycle is equal to or greater than the preset second threshold, the processor 140 may control the operation mode of the first radar sensor 190 to be changed from the reception mode to the detection mode. For example, the preset second threshold and the preset second cycle may be determined based on the data regarding the intensity of the received electronic wave signal stored in the memory 180, and the processor 140 may adaptively change the preset second threshold and the preset second cycle, based on the intensity of the received electronic wave signal stored in the memory 180. For example, a method of determining and adaptively changing the preset second threshold and the preset second cycle may be the same as a method of determining and adaptively changing the preset first threshold and the preset first cycle.

In operation S503, when the average intensity of the first chirp signal received during the preset first cycle is equal to or greater than the preset first threshold, the electronic device 100 according to an embodiment of the disclosure may change the operation mode of the first radar sensor 190 from the detection mode to the reception mode. When the average intensity of the first chirp signal received during the preset first cycle is less than the preset first threshold, the electronic device 100 may maintain the operation mode of the first radar sensor 190 as the detection mode.

According to an embodiment of the disclosure, the second response signal in the detection mode of the first radar sensor 190 may be an electronic wave signal reflected and scattered by the at least one object located around the electronic device 100. The intensity of the second response signal may be weaker than the intensity of the first chirp signal transmitted by the second radar sensor 200 and received by the receiver 193 of the first radar sensor 190. Thus, the processor 140 may determine the operation mode of the first radar sensor 190, based on the intensity of the first chirp signal.

According to an embodiment of the disclosure, when the average intensity of the first chirp signal received during the preset first cycle is equal to or greater than the preset first threshold, the processor 140 may identify the signal received by the first radar sensor 190 as the first chirp signal transmitted by the second radar sensor 200 instead of the second response signal. Thus, when a current operation mode of the first radar sensor 190 is the detection mode, the processor 140 may control the operation mode of the first radar sensor 190 to be changed from the detection mode to the reception mode.

According to an embodiment of the disclosure, when the average intensity of the first chirp signal received during the preset first cycle is less than the preset first threshold, the processor 140 may identify the signal received by the first radar sensor 190 as the second response signal instead of the first chirp signal transmitted by the second radar sensor 200. Thus, when the current operation mode of the first radar sensor 190 is the detection mode, the processor 140 may control the operation mode of the first radar sensor 190 to be kept as the detection mode.

According to an embodiment of the disclosure, the preset first cycle and the preset first threshold may be stored in the memory 180 of the electronic device 100. The preset first cycle and the preset first threshold may be adjusted according to the signal of the user transmitted through the user interface unit 120, and the preset first cycle and the preset first threshold may be adaptively adjusted by the processor 140.

In operation S505, the first radar sensor 190 of the electronic device 100 according to an embodiment of the disclosure may operate as the detection mode, during a preset third cycle.

According to an embodiment of the disclosure, the current operation mode of the first radar sensor 190 may be the detection mode. When the average intensity of the first chirp signal received during the preset first cycle is less than the preset first threshold, the processor 140 may control the operation mode of the first radar sensor 190 to be kept as the detection mode. For example, the processor 140 may control the operation mode of the first radar sensor 190 to be operated as the detection mode, during the preset third cycle.

According to an embodiment of the disclosure, the current operation mode of the first radar sensor 190 may be the reception mode. When the average intensity of the first chirp signal received during the preset second cycle is less than the preset second threshold, the processor 140 may control the operation mode of the first radar sensor 190 to be operated from the reception mode to the detection mode. For example, the processor 140 may control the operation mode of the first radar sensor 190 to be operated as the detection mode, during the preset third cycle.

According to an embodiment of the disclosure, the preset third cycle may be stored in the memory 180 of the electronic device 100. The preset third cycle may be adjusted according to the signal of the user transmitted through the user interface unit 120, and the preset third cycle may be adaptively adjusted by the processor 140.

In operation S507, the first radar sensor 190 of the electronic device 100 according to an embodiment of the disclosure may operate as the reception mode, during the preset third cycle.

According to an embodiment of the disclosure, the current operation mode of the first radar sensor 190 may be the detection mode. When the average intensity of the first chirp signal received during the preset first cycle is equal to or greater than the preset first threshold, the processor 140 may control the operation mode of the first radar sensor 190 to be changed from the detection mode to the reception mode. For example, the processor 140 may control the operation mode of the first radar sensor 190 to be operated as the reception mode, during the preset third cycle.

According to an embodiment of the disclosure, the current operation mode of the first radar sensor 190 may be the reception mode. When the average intensity of the first chirp signal received during the preset second cycle is greater than the preset second threshold, the processor 140 may control the operation mode of the first radar sensor 190 to be kept as the reception mode. For example, the processor 140 may control the operation mode of the first radar sensor 190 to be operated as the reception mode, during the preset third cycle.

According to an embodiment of the disclosure, the preset third cycle may be stored in the memory 180 of the electronic device 100. The preset third cycle may be adjusted according to the signal of the user transmitted through the user interface unit 120, and the preset third cycle may be adaptively adjusted by the processor 140.

In operation S509, when the average intensity of the first chirp signal received during the preset second cycle is less than the preset second threshold, the electronic device 100 according to an embodiment of the disclosure may change the operation mode of the first radar sensor 190 from the reception mode to the detection mode. When the average intensity of the first chirp signal received during the preset second cycle is greater than the preset second threshold, the electronic device 100 may maintain the operation mode of the first radar sensor 190 as the reception mode.

According to an embodiment of the disclosure, when the average intensity of the first chirp signal received during the preset second cycle is less than the preset second threshold, the processor 140 may identify the signal received by the first radar sensor 190 as the second response signal instead of the first chirp signal transmitted by the second radar sensor 200. Thus, when the current operation mode of the first radar sensor 190 is the reception mode, the processor 140 may control the operation mode of the first radar sensor 190 to be changed from the reception mode to the detection mode.

According to an embodiment of the disclosure, when the average intensity of the first chirp signal received during the preset second cycle is greater than or equal to the preset second threshold, the processor 140 may identify the signal received by the first radar sensor 190 as the first chirp signal transmitted by the second radar sensor 200 instead of the second response signal. Thus, when the current operation mode of the first radar sensor 190 is the reception mode, the processor 140 may control the operation mode of the first radar sensor 190 to be kept as the reception mode.

According to an embodiment of the disclosure, the preset second cycle and the preset second threshold may be stored in the memory 180 of the electronic device 100. The preset second cycle and the preset second threshold may be adjusted according to the signal of the user transmitted through the user interface unit 120, and the preset second cycle and the preset second threshold may be adaptively adjusted by the processor 140.

Figure 6:
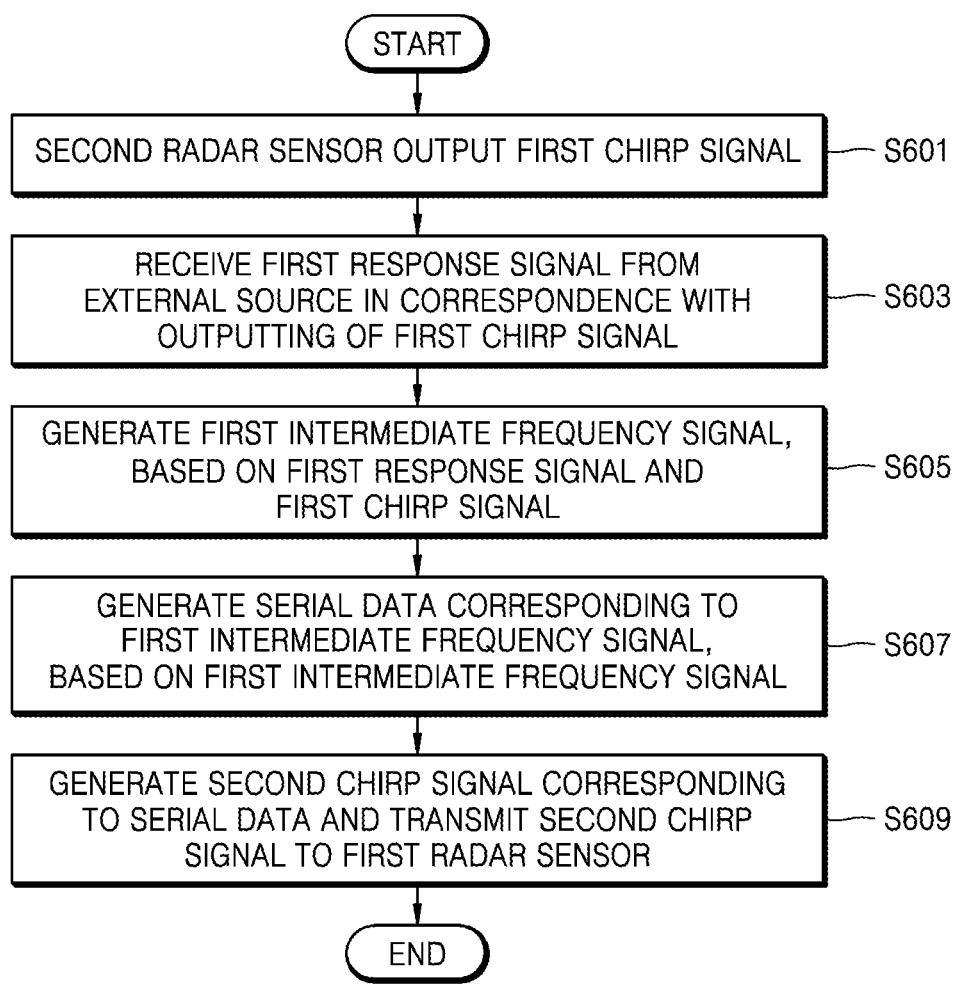
FIG. 6 is a flowchart illustrating an example operation of a second radar sensor according to various embodiments.

FIG. 6 is a flowchart illustrating an example operation of a second radar sensor according to various embodiments.

In operation S601, the second radar sensor 200 according to an embodiment of the disclosure may output the first chirp signal.

According to an embodiment of the disclosure, the second radar sensor 200 may be a radar sensor device for radar signal transmission/reception. The signal generator 221 of the second radar sensor 200 may generate a first chirp signal of which a frequency and a phase consecutively changes with time, and the transmitter 204 may output the first chirp signal. The signal generator 221 may generate the first chirp signal, and the generated first chirp signal may be output by the transmitter 204 to sense the at least one object located around the electronic device 100. For example, the first chirp signal generated by the second radar sensor 200 may include the plurality of chirp waveforms in which the frequency periodically changes from 60 GHZ to 64 GHZ during the second time (for example, 24.576 ms) within the first time (for example, 100 ms). Each of the chirp waveforms may have a length of 0.384 ms, and the plurality of chirp waveforms may include 64 chirp waveforms.

According to an embodiment of the disclosure, the first chirp signal may be transmitted to not only the front surface of the electronic device 100 but also the rear surface thereof on which the first radar sensor 190 may be located. According to the intensity of the first chirp signal transmitted to the rear surface, the operation mode of the radar sensor 190 may be changed.

In operation S603, the second radar sensor 200 according to an embodiment of the disclosure may receive the first response signal from an external source in correspondence with the outputting of the first chirp signal.

For example, the receiver 223 may receive the first response signal, which is the electronic wave signal reflected and scattered by the at least one object located around the electronic device 100, in correspondence with the outputting of the first chirp signal. For example, the receiver 223 may receive the first response signal, which is the electronic wave signal reflected and scattered by the user 250 located around the electronic device 100.

According to an embodiment of the disclosure, at least one first response signal may be received from the at least one object located around the electronic device 100, through the plurality of receivers of the second radar sensor 200. For example, the receiver 1 201 of the second radar sensor 200 may receive, as the response signal 1 211, the electronic wave signal obtained by the electronic wave signal 214 being reflected and scattered by the user 250. The receiver 2 202 of the second radar sensor 200 may receive, as the response signal 2 212, the electronic wave signal obtained by the electronic wave signal 214 being reflected and scattered by the user 250. The receiver 3 203 of the second radar sensor 200 may receive, as the response signal 3 213, the electronic wave signal obtained by the electronic wave signal 214 being reflected and scattered by the user 250. For example, the receiver 1 201 of FIG. 1E may not receive a valid first response signal 211 because the receiver 1 201 is covered by the decorative bezel 195, the receiver 2 202 may receive a valid first response signal 212, and the receiver 3 203 may also receive a valid first response signal 213.

In operation S605, the second radar sensor 200 according to an embodiment of the disclosure may generate the first intermediate frequency signal, based on the first response signal and the first chirp signal.

According to an embodiment of the disclosure, the second radar sensor 200 may generate the first intermediate frequency signal through the mixer, based on the first response signal and the first chirp signal. The second radar sensor 200 may generate a frequency corresponding to a difference between the first response signal and the first chirp signal as the first intermediate frequency signal. For example, a frequency of the first chirp signal and a frequency of the first response signal may correspond to 60 GHZ-64 GHZ, and a frequency of the first intermediate frequency signal corresponding to the difference between the first response signal and the first chirp signal may be 4 GHZ. The second radar sensor 200 may generate the first intermediate frequency signal through the mixer, based on the first response signal and the first chirp signal. For example, the second radar sensor 200 may generate the first intermediate frequency signal corresponding to a difference between the first chirp signal and the first response signal, based on the first response signal and the first chirp signal.

In operation S607, the second radar sensor 200 according to an embodiment of the disclosure may generate serial data corresponding to the first intermediate frequency signal, based on the first intermediate frequency signal.

According to an embodiment of the disclosure, the second radar sensor 200 according to an embodiment of the disclosure may generate serial data corresponding to the first intermediate frequency signal, based on the first intermediate frequency signal. The second radar sensor 200 may generate serial data corresponding to the first intermediate frequency signal, through the ADC and the SPI. The serial data may be serial digital data, and the serial data may be in the form of a bitstream. The serial data may be stored in the register of the second radar sensor 200. For example, the serial data may be stored in a First In First Out register, and the serial data stored in the First In First Out register may be used to modulate the first chirped signal.

According to an embodiment of the disclosure, the second radar sensor 200 may obtain the distance, the angle, and the speed of the at least one object located around the electronic device 100 corresponding to the serial data, through the MCU. The MCU (not shown) inside or outside the second radar sensor 200 may generate a complex matrix by performing range fast Fourier transform and angular fast Fourier transform on the input serial data. The MCU may obtain the distance, the angle, and the speed of the at least one object located around the electronic device 100, based on the generated complex matrix. However, when the second radar sensor 200 includes no communication interface, the second radar sensor 200 may not transmit, to the electronic device 100, data about the distance, the angle, and the speed of the at least one object located around the electronic device 100, and thus there may be a need to generate the second chirp signal so that the second chirp signal corresponds to the serial data based on the first chirp signal.

In operation S609, the second radar sensor 200 according to an embodiment of the disclosure may generate the second chirp signal corresponding to the serial data, based on the serial data, and may transmit the second chirp signal to the first radar sensor.

The second radar sensor 200 may not include an RF module for RF wireless communication of 100 to 300 MHZ or more. Thus, the second radar sensor 200 may need to transmit or receive an electronic wave signal through the transmitter 204 and the receiver 223.

According to an embodiment of the disclosure, the second radar sensor 200 may generate the second chirp signal corresponding to the serial data, based on the serial data. The generated second chirp signal may be a result of modulating the first chirp signal to correspond to the serial data. For example, the first chirp signal may be modulated into the second chirp signal corresponding to the serial data through the phase locked circuit and the voltage controlled oscillator of the modulator 194. A method of generating the second chirp signal corresponding to the serial data will be described in greater detail below with reference to FIG. 8B.

According to an embodiment of the disclosure, the second radar sensor 200 may transmit the second chirp signal corresponding to the serial data to the first radar sensor 190. The transmitted second chirp signal, which is an analog signal, may be an analog signal corresponding to the serial data (for example, the serial data may be serial digital data). The second chirp signal may be transmitted to the first radar sensor 190 during the time (for example, 75.424 ms) excluding the preset second time within the preset first time. A method of transmitting the second chirp signal will be described later in greater detail below with reference to FIG. 8B.

Figure 7:
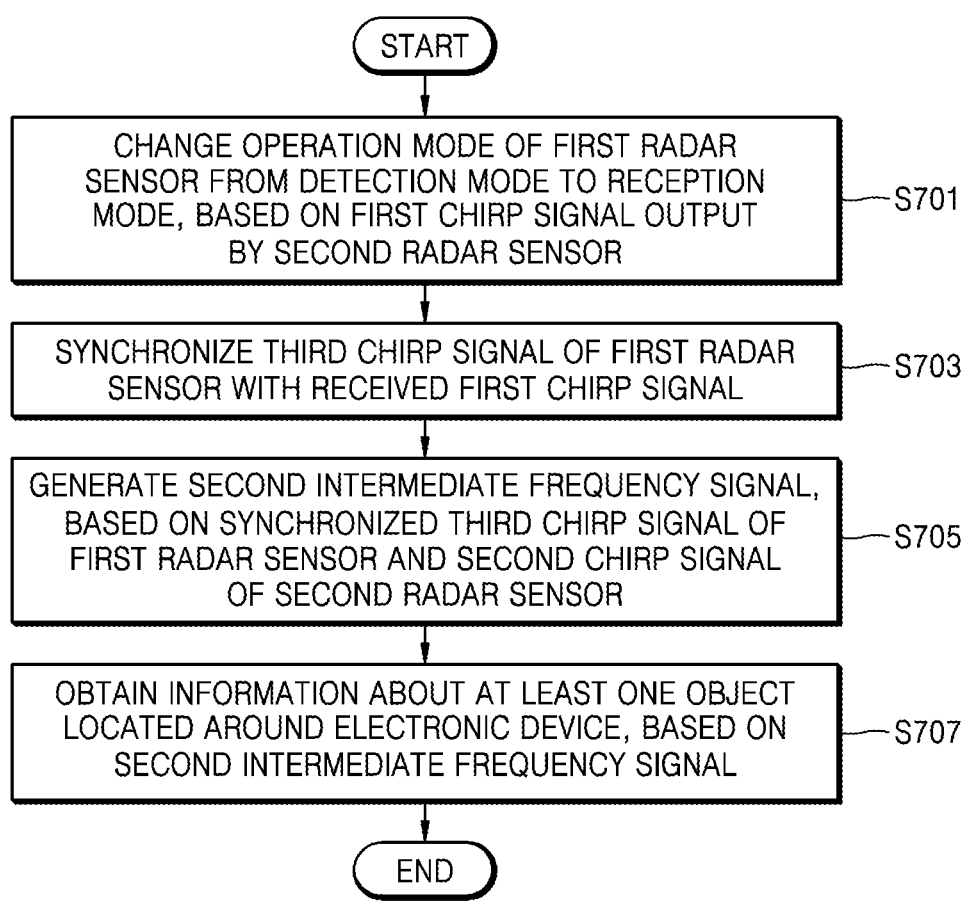
FIG. 7 is a flowchart illustrating an example method of obtaining information about at least one object located around an electronic device, based on a received second chirp signal transmitted by a second radar sensor, according to various embodiments.

FIG. 7 is a flowchart illustrating an example method of obtaining information about at least one object located around an electronic device, based on a received second chirp signal transmitted by a second radar sensor, according to various embodiments.

In operation S701, the first radar sensor 190 according to an embodiment of the disclosure may change the operation mode of the first radar sensor 190 from the detection mode to the reception mode, based on the first chirp signal output by the second radar sensor.

According to an embodiment of the disclosure, the processor 140 may control the operation mode of the first radar sensor to be changed from the detection mode to the reception mode, based on the first chirp signal. For example, when the average intensity of the first chirp signal received during the preset first cycle is equal to or greater than the preset first threshold, the processor 140 may control the operation mode of the first radar sensor 190 to be changed from the detection mode to the reception mode. For example, the preset first threshold and the preset first cycle may be determined based on the data regarding the intensity of the received electronic wave signal stored in the memory 180.

In operation S703, the electronic device 100 may control the third chirp signal of the first radar sensor to be synchronized with the received first chirp signal.

According to an embodiment of the disclosure, the processor 140 may control the third chirp signal to be synchronized with the first chirp signal input to the modulator 194. For example, the phase locked circuit that may be included in the modulator 194 may detect a phase difference between the third chirp signal and the received first chirp signal. The processor 140 may control the synchronized third chirp signal to be output, by adjusting an input voltage through the voltage controlled oscillator.

In operation S705, the first radar sensor 190 according to an embodiment of the disclosure may generate the second intermediate frequency signal, based on the synchronized third chirp signal of the first radar sensor and the second chirp signal of the second radar sensor.

According to an embodiment of the disclosure, the first radar sensor 190 may generate the second intermediate frequency signal, based on the synchronized third chirp signal and the second chirp signal of the second radar sensor 200. A method of generating the second intermediate frequency signal will be described in greater detail below with reference to FIG. 8C.

In operation S707, the first radar sensor 190 according to an embodiment of the disclosure may obtain the information about the at least one object located around the electronic device, based on the second intermediate frequency signal.

According to an embodiment of the disclosure, the first radar sensor 190 may obtain the information about the at least one object located around the electronic device, based on the second intermediate frequency signal. For example, the information about the at least one object may include at least one of location information about the at least one object and motion information about the at least one object, the location information may include distance information about a distance between the electronic device and the at least one object located around the electronic device and angle information about an angle between the at least one object and the electronic device, and the motion information may include speed information and motion information of the at least one object. The motion information may be information about a speed and an angular speed of each of body parts such as the hands, feet, and head of the user 250, when the at least one object is the user 250.

According to an embodiment of the disclosure, the second intermediate frequency signal may be a signal having a frequency-shift keying (FSK) form to correspond to digital data. Accordingly, a high-frequency portion of a frequency-shift keying (FSK) signal may correspond to a bit value 1 of a bit stream, and a low-frequency portion of the frequency-shift keying (FSK) signal may correspond to a bit value 0 of the bit stream. The processor 140 may obtain the information about the at least one object located around the electronic device, based on the second intermediate frequency signal in the FSK form.

Figure 8A:
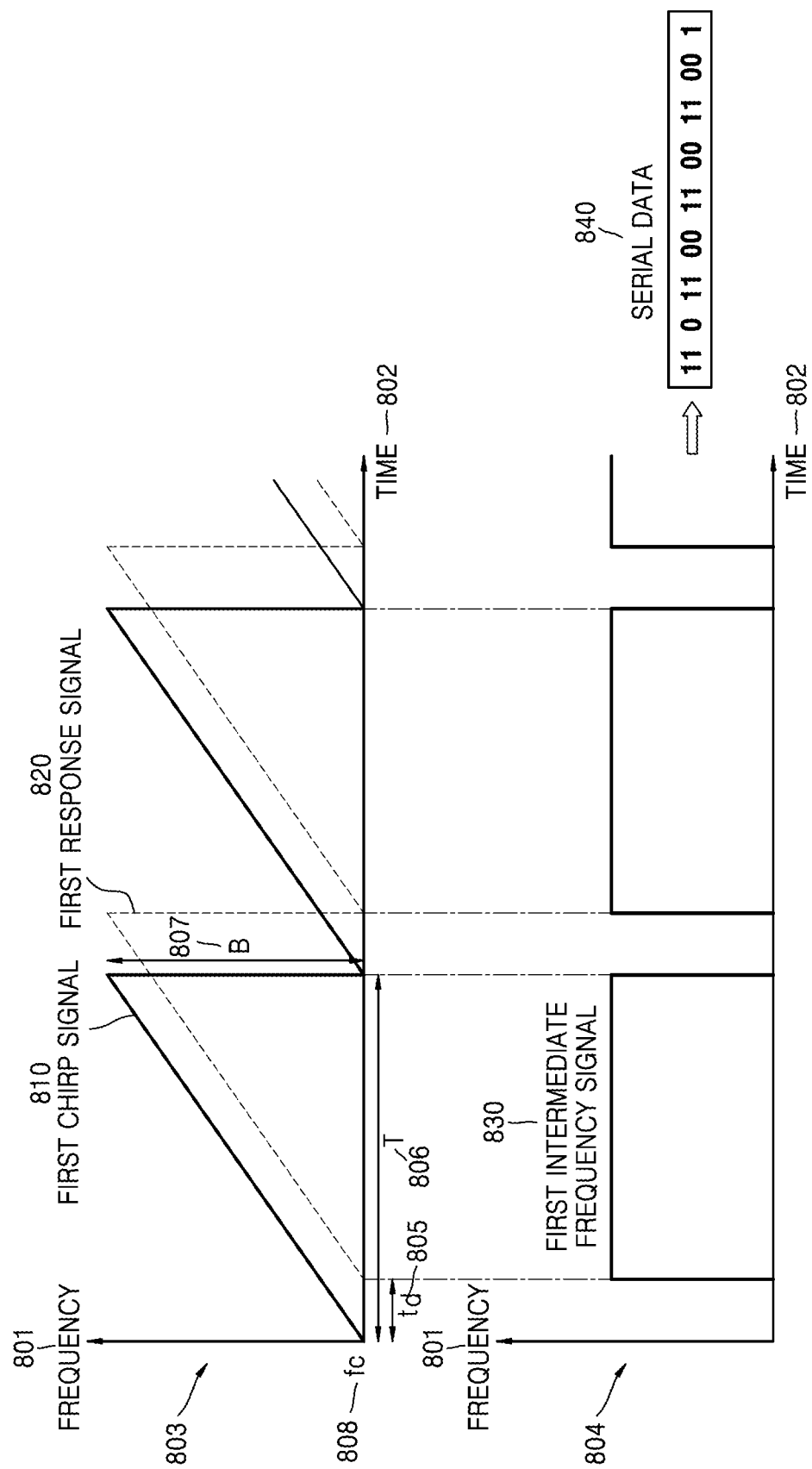
FIG. 8A is a graph illustrating an example method, performed by a second radar sensor, of generating a first intermediate frequency signal and serial data, according to various embodiments.

FIG. 8A is a graph illustrating an example method, performed by a second radar sensor, of generating a first intermediate frequency signal and serial data, according to various embodiments.

According to an embodiment of the disclosure, the second radar sensor 200 may generate a first intermediate frequency signal 830, based on a first response signal 820 and a first chirp signal 810.

According to an embodiment of the disclosure, a first graph 803 shows the first chirp signal 810 and the first response signal 820, and the x axis may indicate time 802 and the y axis may indicate a frequency 801.

According to an embodiment of the disclosure, the first chirp signal 810 may include a plurality of chirp waveforms in which a frequency periodically changes from 60 GHZ to 64 GHZ during a preset second time (for example, 24.576 ms) within a preset first time (for example, 100 ms). Graph 803 shows a first chirp signal 810 including two chirp waveforms. Each of the chirp waveforms may have a length of 0.384 ms, and the plurality of chirp waveforms may include 64 chirp waveforms. The preset first time and the preset second time may be stored in a memory (not shown) of the second radar sensor 200.

According to an embodiment of the disclosure, the first response signal 820 may be an electronic wave signal reflected and scattered by the at least one object located around the electronic device 100, and may be received by the receiver 223 of the second radar sensor 200. Thus, a delay between the first chirp signal 810 and the first response signal 820 may occur based on a distance between the at least one object and the electronic device 100, and may be proportional to the distance between the at least one object and the electronic device 100. Graph 803 also shows a first delay $t_d$ 805 between the first chirp signal 810 and the first response signal 820.

According to an embodiment of the disclosure, graph 803 shows a cycle T 806 of the first chirp waveform 810, the first delay $t_d$ 805, a bandwidth B 807 of the first chirp signal 810, and a carrier frequency $f_c$ 808. Respective frequencies of the first chirp signal 810 and the first response signal 820 may vary from $f_c$ to $f_c$+B.

According to an embodiment of the disclosure, the electronic device 100 may generate the first intermediate frequency signal 830 corresponding to a difference between the first chirp signal 810 and the first response signal 820. The first chirp signal $x_1$ 810 and the second response signal $x_2$ 820 may be expressed by Equations (1) and (2) below, respectively, where A may indicate an amplitude.

$$x_1 = A\cos\left(2\pi\left(f_c t + \frac{B}{2T}t^2\right)\right) \quad (1)$$

$$x_2 = A\cos\left(2\pi\left(f_c(t-t_d) + \frac{B}{2T}(t-t_d)^2\right)\right) \quad (2)$$

According to an embodiment of the disclosure, graph 804 shows the first intermediate frequency signal 830, and the first intermediate frequency signal $x_{IF}$ 830 may be expressed as Equation (3) below. The axis x of graph 804 may indicate the time 802, and the y axis of graph 804 may indicate the frequency 801.

$$x_{IF} = A\cos\left(2\pi\left(f_c t_d + \frac{B}{T}t \times t_d - \frac{B}{2T}t_d^2\right)\right) \quad (3)$$

According to an embodiment of the disclosure, a frequency $f_{IF}$ of the first intermediate frequency signal 830 may be expressed as Equation (4) through Equation (3). A phase $\Phi_n$ of the first intermediate frequency signal 830 may be expressed as Equation (5) through a first chirp waveform.

$$f_{IF} = \frac{Bt_d}{T} = \frac{2Bd}{cT} \quad (4)$$

$$\Phi_n = f_c t_d - \frac{B}{2T}t_d^2 \quad (5)$$

According to an embodiment of the disclosure, a distance d between the electronic device 100 and the at least one object located around the electronic device 100 may be obtained using Equation (6). A velocity v of the at least one object located around the electronic device 100 may be expressed as Equation (7) through a phase difference ΔΦ obtained through the first chirp waveform and a second chirp waveform.

$$d = \frac{cTf_{IF}}{2B} \quad (6)$$

$$v = \frac{\lambda\Delta\Phi}{4\pi T} \quad (7)$$

According to the above-described process, data of the distance, the speed, and the like of the at least one object located around the electronic device may be calculated through the first intermediate frequency signal 830.

According to an embodiment of the disclosure, the second radar sensor 200 may generate serial data 840 corresponding to the first intermediate frequency signal 830 through the ADC and the SPI. The serial data 840 may be a bitstream of FIG. 8A. The generated serial data 840 may be stored in the register (not shown) of the second radar sensor 200 and then used to generate a second chirp signal.

Figure 8B:
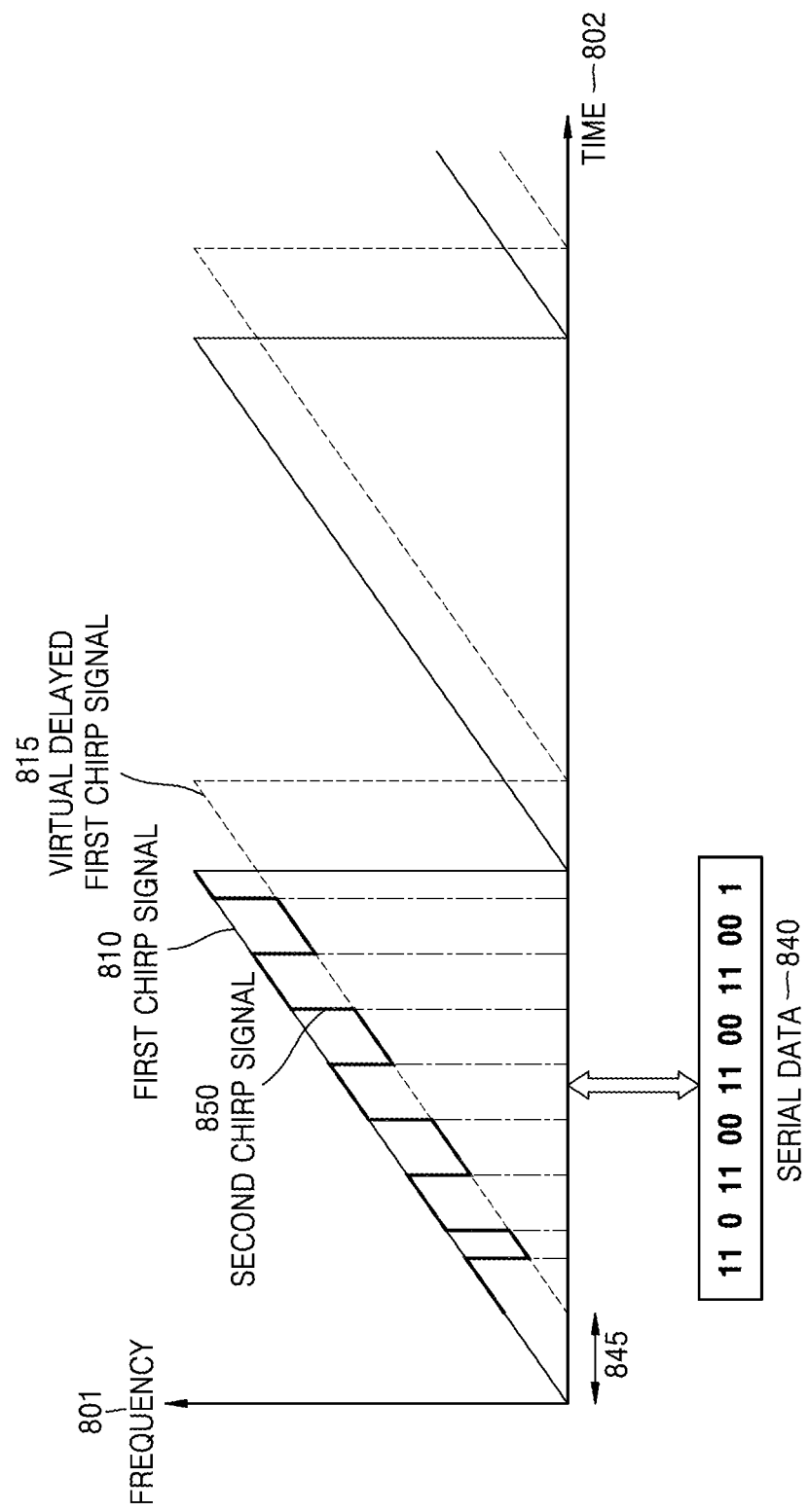
FIG. 8B is a graph illustrating an example method, performed by a second radar sensor, of generating a second chirp signal, according to various embodiments.

FIG. 8B is a graph illustrating an example method, performed by a second radar sensor, of generating a second chirp signal, according to various embodiments.

According to an embodiment of the disclosure, the second radar sensor 200 may generate a second chirp signal 850 corresponding to the serial data 840. The first chirp signal 810 may be modulated into the second chirp signal 850 corresponding to the serial data 840 through the phase locked circuit and the voltage controlled oscillator. For example, the second chirp signal 850 may be modulated based on the first chirp signal 810 and a virtual delayed first chirp signal 815. The virtual delayed first chirp signal 815 may be obtained by delaying the first chirp signal 810 by a preset delay time 1 845.

According to an embodiment of the disclosure, the second chirp signal 850 may be modulated to be the same as the first chirp signal 810 or the virtual delayed first chirp signal 815 according to the values of the bits of the serial data 840. For example, when a bit of the serial data 840 has a value of 1, the second chirp signal 850 may be modulated to be the same as the first chirp signal 810 during a preset third time. The preset third time may be a time corresponding to one bit. When the bit of the serial data 840 has a value of 0, the second chirp signal 850 may be modulated to be the same as the virtual delayed first chirp signal 815 during the preset third time.

When consecutive bits of a bitstream each having a bit value of 1 are included in the serial data 840, the second chirp signal 850 may be modulated to be the same as the first chirp signal 810 during a longer time than the preset third time, based on the number of consecutive bits. When consecutive bits of a bitstream each having a bit value of 0 are included in the serial data 840, the second chirp signal 850 may be modulated to be the same as the virtual delayed first chirp signal 815 during the preset third time, during a longer time than the preset third time, based on the number of consecutive bits. For example, 1, which is a most significant bit of the serial data 840, is included in consecutive bits 11. Thus, the second chirp signal 850 may be modulated to be the same as the first chirp signal 810 during a time two times longer than the preset third time to correspond to the consecutive bits 11.

According to an embodiment of the disclosure, the second radar sensor 200 may transmit the second chirp signal 850 to the first radar sensor 190. The second chirp signal may be transmitted to the first radar sensor 190 during the time (for example, 75.424 ms) excluding the preset second time within the preset first time. For example, after generating the serial data 840, the second radar sensor 200 may generate the second chirp signal 850 without special delays, and the second radar sensor 200 may transmit the second chirp signal 850 to the first radar sensor 190.

Figure 8C:
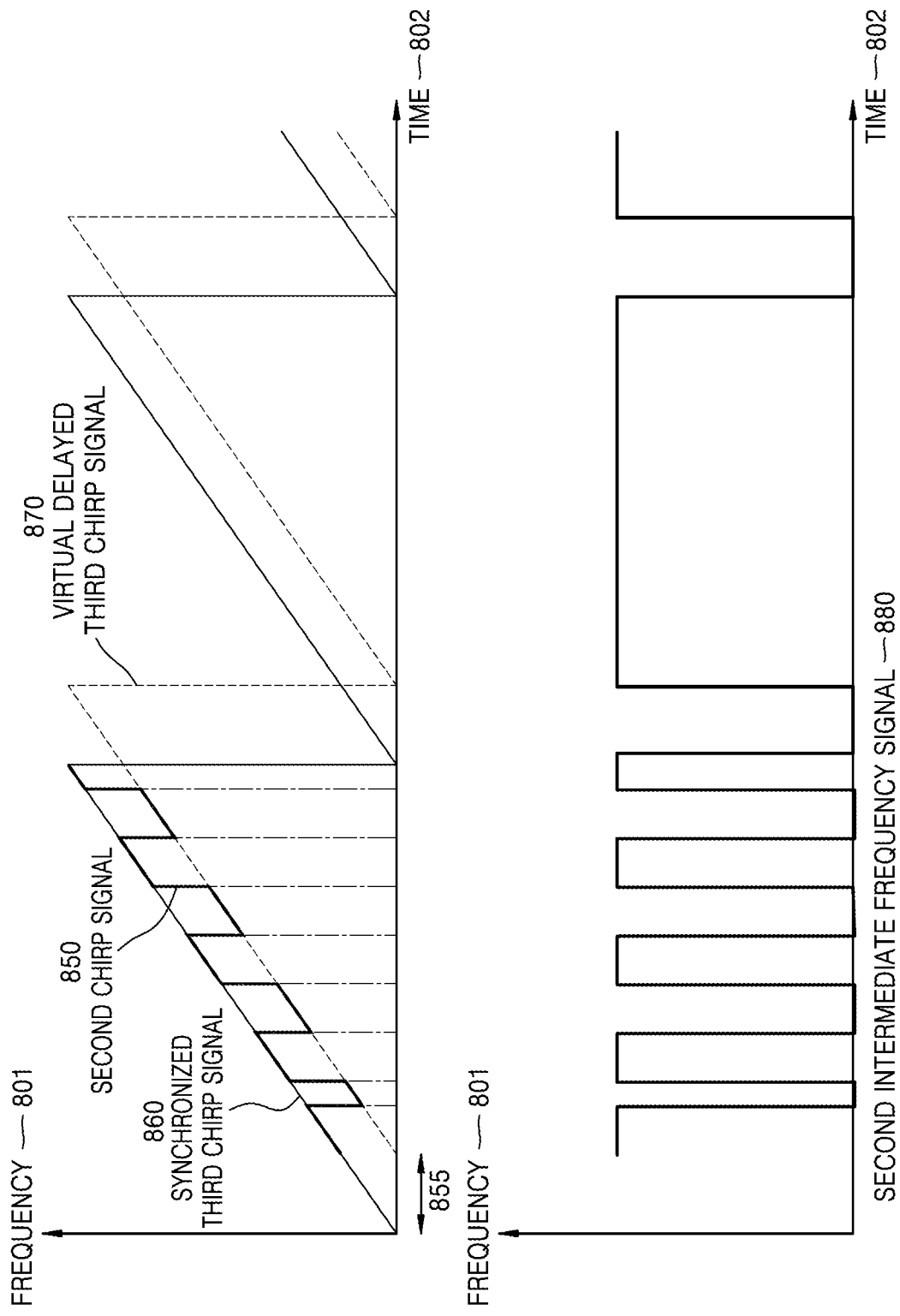
FIG. 8C is a graph illustrating an example method, performed by a first radar sensor of an electronic device, of generating a second intermediate frequency signal, according to various embodiments.

FIG. 8C is a graph illustrating an example method, performed by a first radar sensor of an electronic device, of generating a second intermediate frequency signal, according to various embodiments.

According to an embodiment of the disclosure, the first radar sensor 190 may receive the second chirp signal 850. When the first radar sensor 190 operates in the reception mode, the processor 140 may control the third chirp signal to be synchronized with the first chirp signal 810. The synchronized chirp signal 860 may have the same frequency and the same phase as the first chirp signal.

According to an embodiment of the disclosure, the first radar sensor 190 may generate a virtual delayed third chirp signal 870, based on the synchronized third chirp signal 860. For example, the virtual delayed third chirp signal 870 may be obtained by delaying the synchronized chirp signal 860 by a preset delay time 3 855. The preset delay time 3 855 may be the same as the preset delay time 1 845.

According to an embodiment of the disclosure, the second radar sensor 200 may generate a second intermediate frequency signal 880, based on the virtual delayed third chirp signal 870 and the second chirp signal 850. For example, the second radar sensor 200 may generate the second intermediate frequency signal 880 through the mixer, based on the virtual delayed third chirp signal 870 and the second chirp signal 850. For example, the electronic device 100 may generate the second intermediate frequency signal 880 corresponding to a difference between the second chirp signal 850 and the virtual delayed third chirp signal 870, based on the virtual delayed third chirp signal 870 and the second chirp signal 850.

The second intermediate frequency signal 880 may be a signal in an FSK form to correspond to digital data (for example, the serial data 840). Thus, even when the external radar sensor 200 include no special RF modules, the electronic device 100 may generate the second intermediate frequency signal 880 corresponding to the serial data 840.

The electronic device 100 may obtain the information about the at least one object located around the electronic device 100, based on the second intermediate frequency signal 880 in the FSK form.

Figure 9:
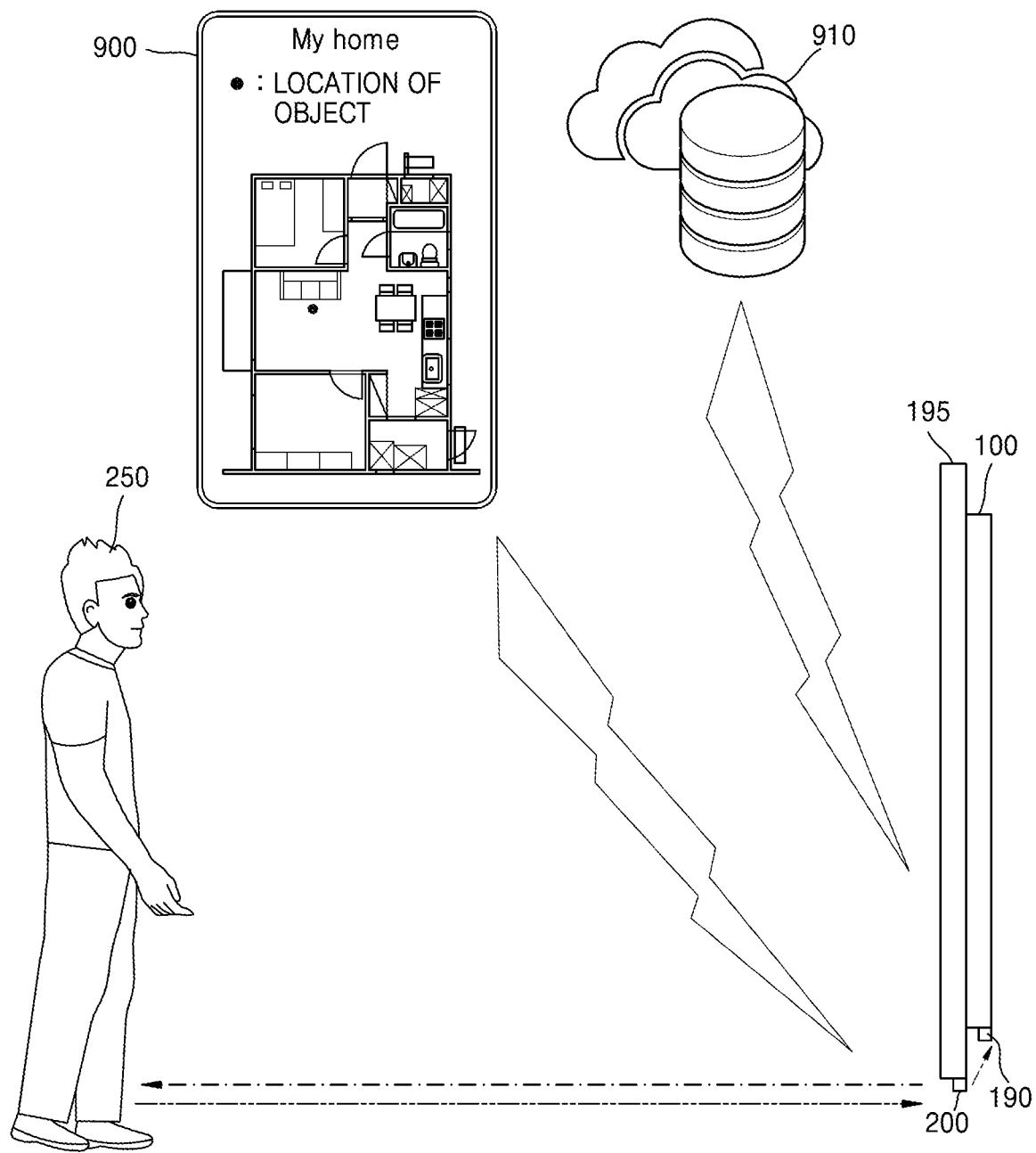
FIG. 9 is a diagram illustrating an example operation, performed by an electronic device, of transmitting information about at least one object located around the electronic device to a server device or a mobile terminal and an example operation, performed by the electronic device, of receiving the information about the at least one object located around the electronic device from the server device or the mobile terminal, according to various embodiments.

FIG. 9 is a diagram illustrating an example operation, performed by an electronic device, of transmitting information about at least one object located around the electronic device to a server device or a mobile terminal and an operation, performed by the electronic device, of receiving the information about the at least one object located around the electronic device from the server device or the mobile terminal, according to various embodiments.

According to an embodiment of the disclosure, the electronic device 100 may include the communication interface 160 for performing communication with an external apparatus. According to an embodiment of the disclosure, the electronic device 100 may perform communication with a server device 910 or a mobile terminal 900 through the communication interface 160. The communication interface 160 may include a short-range wireless communication unit, a mobile communication unit, etc. Examples of the short-range wireless communication interface may include, but are not limited to, a Bluetooth communication interface, a Bluetooth Low Energy (BLE) communication interface, a near field communication (NFC) interface, a wireless local area network (WLAN) (e.g., Wi-Fi) communication interface, a ZigBee communication interface, an infrared Data Association (IrDA) communication interface, a Wi-Fi direct (WFD) communication interface, an ultra wideband (UWB) communication interface, and an Ant+ communication interface.

According to an embodiment of the disclosure, the electronic device 100 may obtain the information about the at least one object located around the electronic device 100, based on a second intermediate frequency signal in the FSK form. According to an embodiment of the disclosure, the electronic device 100 may transmit the information about the at least one object located around the electronic device 100 to the server device 910 or the mobile terminal 900 via the communication interface 160. For example, the information about the at least one object may include at least one of location information about the at least one object and motion information about the at least one object, the location information may include distance information about a distance between the electronic device and the at least one object located around the electronic device and angle information about an angle between the at least one object and the electronic device, and the motion information may include speed information and motion information of the at least one object. The motion information may be information about a speed and an angular speed of each of body parts such as the hands, feet, and head of the user 250, when the at least one object is the user 250.

According to an embodiment of the disclosure, the electronic device 100 may receive the information about the at least one object located around the electronic device 100 from the server device 910 or the mobile terminal 900. Based on whether the information about the at least one object located around the electronic device 100 received from the server device 910 or the mobile terminal 900 is identical with the information about the at least one object located around the electronic device 100 obtained by the electronic device 100, the processor 140 may change or maintain the operation mode of the first radar sensor 190.

According to an embodiment of the disclosure, the electronic device 100 may calculate a distance between the electronic device 100 and the at least one object located around the electronic device 100, an angle therebetween, and a speed of the at least one object. The electronic device 100 may include an artificial intelligence (AI) model for controlling the first radar sensor 190, based on the information about the at least one object located around the electronic device 100.

According to an embodiment of the disclosure, the electronic device 100 may directly generate the AI model or may refine the AI model, using training data. The electronic device 100 may receive an AI model trained in the electronic device 100 from the server device 910, and may store the trained AI model in the memory 180. The training data of the AI model may be information or data about the at least one object located around the electronic device 100 received from the server device 910 or the mobile terminal 900 and information or data about the at least one object located around the electronic device 100 obtained by the electronic device 100.

The AI model may include a plurality of neural network layers. Each of the plurality of neural network layers has a plurality of weight values, and performs a neural network calculation through a calculation between a calculation result of a previous layer and the plurality of weight values. The plurality of weight values of the plurality of neural network layers may be optimized by the learning result of the AI model. For example, a plurality of weight values may be updated so that a loss value or a cost value obtained from the AI model is reduced or minimized during a learning process. The artificial neural network may include a deep neural network (DNN), for example, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), or a Deep Q-Networks, but embodiments of the disclosure are not limited thereto.

According to an embodiment of the disclosure, the electronic device 910 may include a communication interface for performing communication with an external apparatus. According to an embodiment of the disclosure, the server device 910 may perform communication with the electronic device 100 or the mobile terminal 900 through the communication interface. According to an embodiment of the disclosure, the electronic device 100 may transmit, to the server device 910, the distance between the electronic device 100 and the at least one object located around the electronic device 100, the angle therebetween, and the speed of the at least one object, which are obtained by the electronic device 100.

The mobile terminal 900 according to an embodiment of the disclosure may be realized in various types. Examples of the mobile terminal 900 may include, but are not limited to, a digital camera, a smartphone, a laptop computer, a tablet personal computer (PC), an electronic-book terminal, a digital broadcasting terminal, personal digital assistants (PDAs), a portable multimedia player (PMP), a navigation device, and an MP3 player. For example, the mobile terminal 900 may be a wearable device that may be worn by a user. The wearable device may include at least one of an accessory type device (e.g., a watch, a ring, a wrist band, an ankle, a necklace, eyeglasses, or a contact lens), a head-mounted-device (HMD), a fabric or clothing integrated device (e.g., electronic clothing), a body-attached device (e.g., a skin pad), or a bio-implant device (e.g., an implantable circuit). However, it will be understood that the disclosure is not so limited.

Figure 10A:
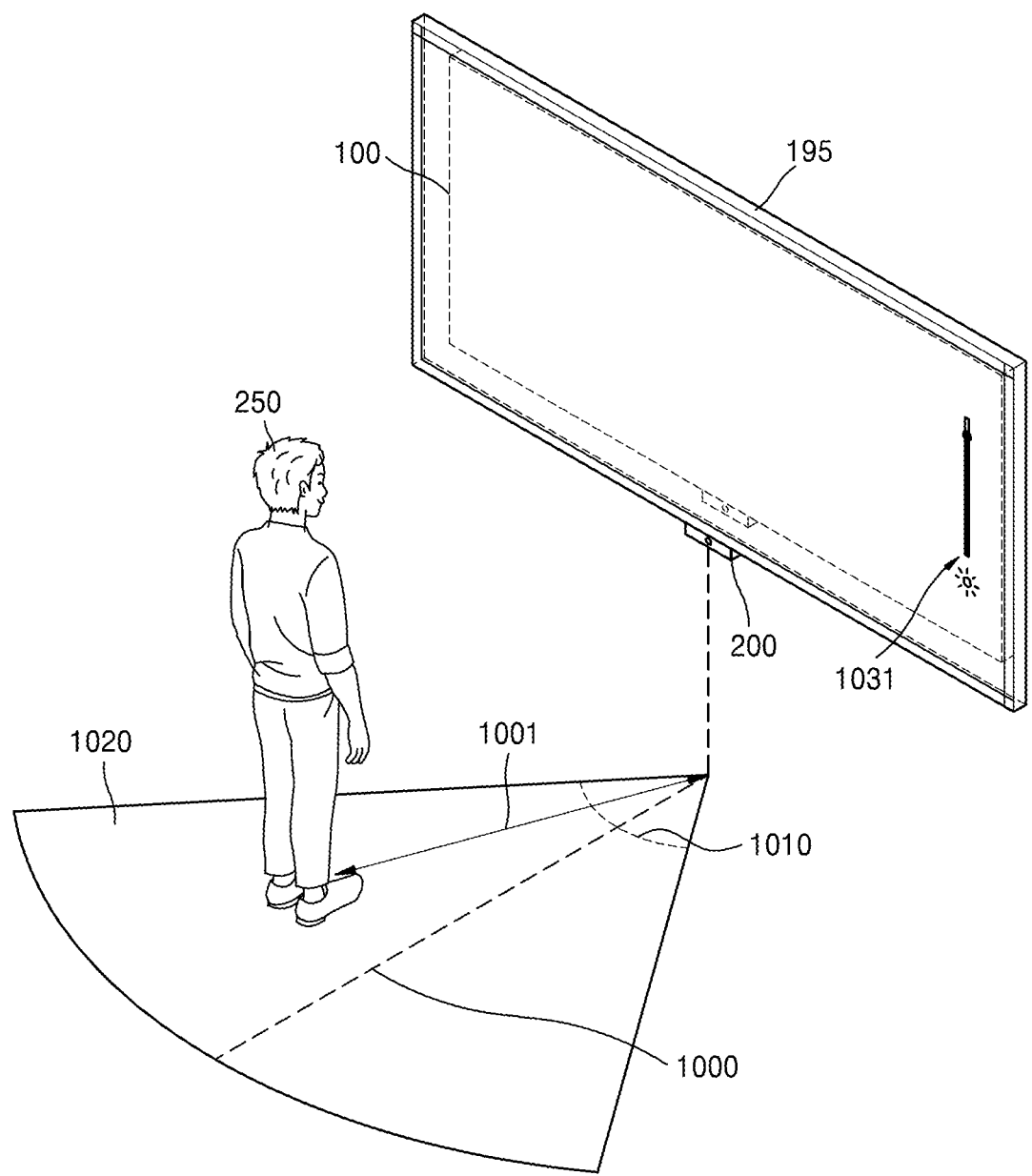
FIG. 10A is a diagram illustrating an example operation of adjusting the brightness of a display of an electronic device when at least one user is located within a first search range of the electronic device according to various embodiments.
Figure 10B:
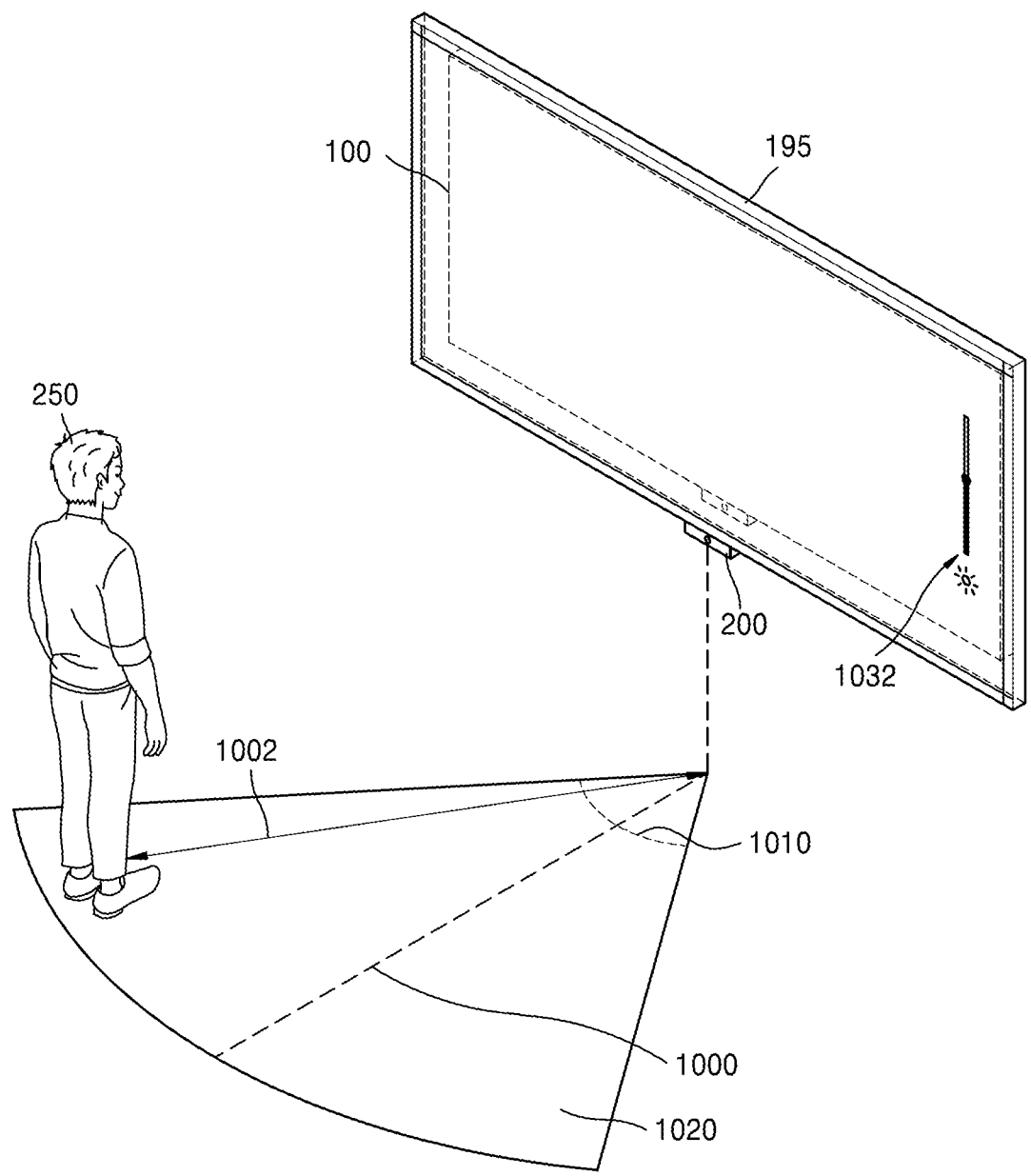
FIG. 10B is a diagram illustrating an example operation of adjusting the brightness of a display of an electronic device when at least one user is located within a first search range of the electronic device according to various embodiments.

FIGS. 10A and 10B are diagrams illustrating an example operation of adjusting the brightness of a display of an electronic device when at least one user is located within a first search range of the electronic device according to various embodiments.

According to an embodiment of the disclosure, the electronic device 100 may obtain at least one of a distance between the electronic device 100 and the user 250 located around the electronic device 100, an angle therebetween, or a speed of the user 250 through the second radar sensor 200.

A first search range 1020 of the electronic device 100 may be determined based on at least one of a preset first distance 1000 or a preset first angle 1010. At least one of the preset first distance 1000 or the preset first angle 1010 may be stored in the memory 180 of the electronic device 100. At least one of the preset first distance 1000 or the preset first angle 1010 may be adjusted by a user input or a processor. The first search range 1020 may be determined based on the preset first angle 1010, and the first search range 1020 may be determined based on the preset first distance 1000.

The processor 140 may determine whether the user 250 is located in the first search range 1020 of the electronic device 100, based at least one of the distance or angle between the user 250 and the electronic device 100. For example, it may be determined that the user 250 according to FIGS. 10A and 10B is located within the first search range 1020 of the electronic device 100.

According to an embodiment of the disclosure, when the user 250 is located within the first search range 1020 of the electronic device 100, the processor 140 may adjust the brightness of the display 151 of the electronic device 100, based on the distance between the user 250 and the electronic device 100. For example, the brightness of the display 151 of the electronic device 100 may be adjusted based on a distance 1001 between the user 250 and the electronic device 100 of FIG. 10A and a distance 1002 between the user 250 and the electronic device 100 of FIG. 10B. For example, because the distance 1001 between the user 250 and the electronic device 100 is small, a brightness 1031 of the display 151 may be kept high. Because the distance 1002 between the user 250 and the electronic device 100 is greater than the distance 1001 between the user 250 and the electronic device 100, a brightness 1032 of the display 151 may be kept lower than the brightness 1031 of the display 151.

Figure 10C:
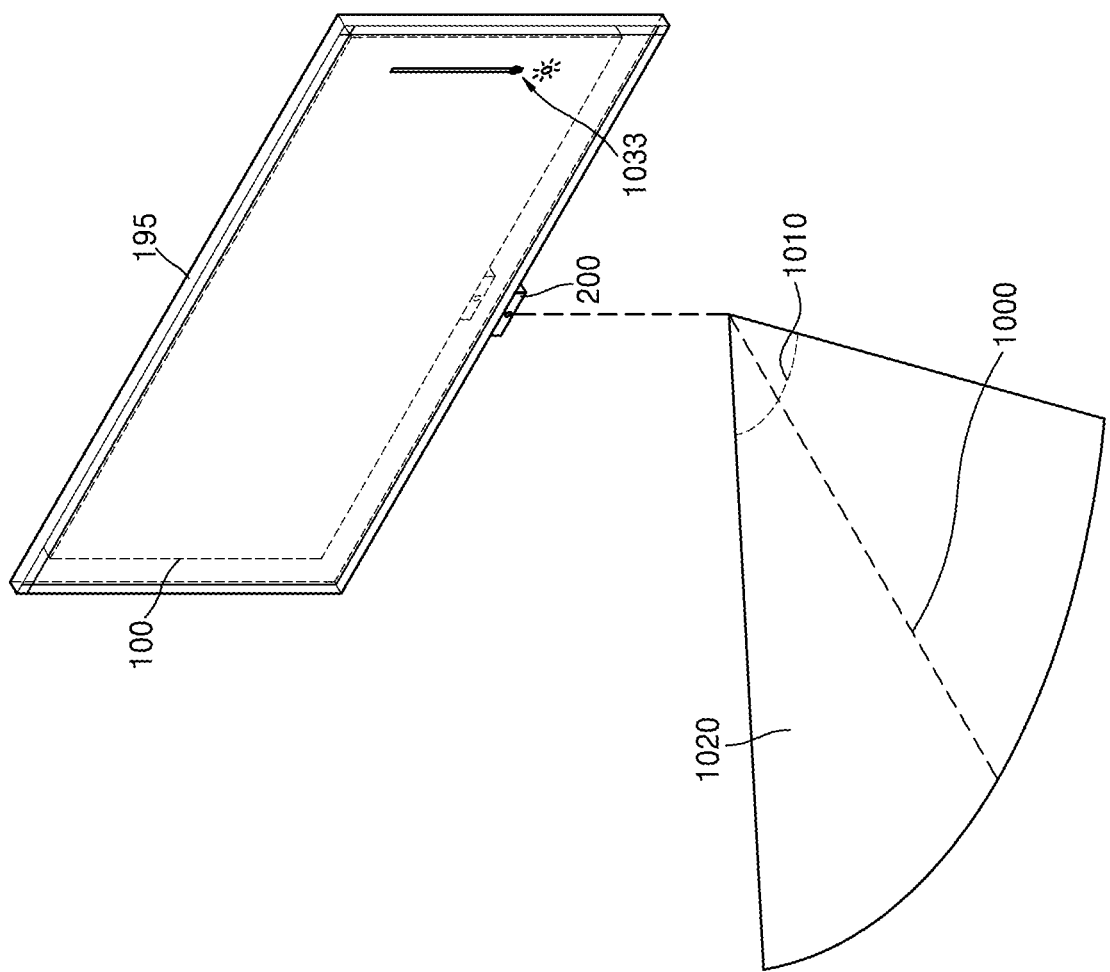
FIG. 10C is a diagram illustrating an example operation of adjusting the brightness of a display of an electronic device when at least one user is located outside a first search range of the electronic device according to various embodiments.

FIG. 10C is a diagram illustrating an example operation of adjusting the brightness of a display of an electronic device when at least one user is located outside a first search range of the electronic device according to various embodiments.

According to an embodiment of the disclosure, the electronic device 100 may obtain at least one of a distance between the electronic device 100 and the user 250 located around the electronic device 100 or an angle therebetween through the second radar sensor 200. At least one of the preset first distance 1000 or the preset first angle 1010 may be stored in the memory 180 of the electronic device 100. The first search range 1020 of the electronic device 100 may be determined based on at least one of the preset first distance 1000 or the preset first angle 1010. The preset first distance 1000 and the preset first angle 1010 may be changed by a user input or a processor.

The processor 140 may determine whether the user 250 is located in the first search range 1020 of the electronic device 100, based on at least one of the distance or angle between the user 250 and the electronic device 100. For example, it may be determined that the user 250 according to FIG. 10C is located outside the first search range 1020 of the electronic device 100.

According to an embodiment of the disclosure, when the user 250 is located outside the first search range 1020 of the electronic device 100, the brightness of the display 151 of the electronic device 100 may be kept low, or the display 151 of the electronic device 100 may operate in a power saving mode. For example, a brightness 1033 of the display unit 151 of FIG. 10C may be kept low.

FIG. 11 is a diagram illustrating an example operation of outputting a message including information about at least one object through a display of an electronic device when the at least one object is located within a second search range of the electronic device according to various embodiments.

According to an embodiment of the disclosure, the electronic device 100 may obtain at least one of a distance between the electronic device 100 and an object 1100 located around the electronic device 100 or an angle therebetween through the second radar sensor 200. A second search range 1110 of the electronic device 100 may be determined based on at least one of a preset second distance 1120 or a preset second angle 1130. At least one of the preset second distance 1120 or the preset second angle 1130 may be stored in the memory 180 of the electronic device 100. At least one of the preset first distance 1120 or the preset first angle 1130 may be adjusted by a user input or a processor.

According to an embodiment of the disclosure, the processor 140 may determine whether the object 1100 is located in the second search range 1110 of the electronic device 100, based at least one of the distance or angle between the object 1100 and the electronic device 100. For example, it may be determined that the object 1100 according to FIG. 11 is located within the second search range 1110 of the electronic device 100. When the object 1100 is located within the second search range 1110 of the electronic device 100, the processor 140 may determine the object 1100 as an object located in front of the electronic device 100. According to an embodiment of the disclosure, the preset second distance 1120 may be less than the preset first distance 1000, and the preset second angle 1130 may be less than the preset first angle 1010.

According to an embodiment of the disclosure, the processor 140 may control the display 151 to output information about the object 1100. For example, the information about the object 1100 may be information 1160 about the location of an object, and in detail, may be map information or a message including the location information of the object. The display 151 may output the information 1160 about the location of an object. The information 1160 on the location of an object may also include a request to move the object out of the second search range.

According to an embodiment of the disclosure, the processor 140 may control the communication interface 160 to transmit the information about an object to a user terminal 1140. For example, the user terminal 1140 may receive information 1150 about the location of an object, and may output the information 1150 about the location of an object on a display of the user terminal 1140. A request to move the object out of the second search range may also be output.

A method according to an embodiment of the disclosure may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer using an interpreter or the like as well as machine language codes made by a compiler.

A computer-readable recording medium according to an embodiment of the disclosure may store a program for performing the operations of: receiving a first chirp signal output by the second radar sensor 200; changing the operation mode of the first radar sensor 190 of the electronic device 100 from the detection mode to the reception mode, based on the received first chirp signal; receiving a second chirp signal generated by the second radar sensor 200 through a receiver of a first radar sensor according to the change to the reception mode; and obtaining information about at least one object located in the vicinity of the electronic device 100, based on the received second chirp signal. The second chirp signal may be generated based on the first chirp signal and a first response signal corresponding to the first chirp signal.

An embodiment of the disclosure may also be implemented in the form of a recording medium including instructions executable by a computer, such as a program module executed by a computer. Computer-readable media may be any available media accessible by a computer and includes both volatile and nonvolatile media and removable and non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal, or other transmission mechanism, and includes any information transmission medium. An embodiment of the disclosure may be implemented as a computer program or a computer program product including instructions executable by a computer.

The machine-readable storage medium may be provided as a non-transitory storage medium. Here, a 'non-transitory storage medium' is a tangible device and does not contain a signal (e.g., electromagnetic waves). This term does not distinguish a case in which data is stored semi-permanently in a storage medium from a case in which data is temporarily stored. For example, the non-transitory storage medium may include a buffer in which data is temporarily stored.

A method according to an embodiment of the disclosure may be provided by being included in computer program products. Computer program products are commodities and thus may be traded between sellers and buyers. Computer program products are distributed in the form of device-readable storage media (e.g., compact disc read only memory (CD-ROM)), or may be distributed (e.g., downloaded or uploaded) through an application store (e.g., Play Store™) or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of transmitting and receiving a radar signal, the method comprising:
receiving, by a first radar sensor of an electronic device, a first chirp signal output by a second radar sensor located outside the electronic device, wherein the first chirp signal is outputted to at least one object to sense the at least one object located within a specified proximity of the electronic device and to the first radar sensor of the electronic device;
changing an operation mode of the first radar sensor from a detection mode to a reception mode based on the received first chirp signal;
based on the change to the reception mode, receiving a second chirp signal generated by the second radar sensor through a receiver of the first radar sensor, wherein the second chirp signal is generated based on the first chirp signal and a first response signal which is reflected by the at least one object, in correspondence with the outputting of the first chirp signal; and
obtaining information about the at least one object based on the received second chirp signal.

2. The method of claim 1, wherein the changing of the operation mode of the first radar sensor from the detection mode to the reception mode comprises: changing the operation mode of the first radar sensor from the detection mode to the reception mode, based on an average intensity of the received first chirp signal during a preset first cycle being equal to or greater than a specified first threshold.

3. The method of claim 2, further comprising changing the operation mode of the first radar sensor from the reception mode to the detection mode, based on an average intensity of the received first chirp signal during a preset second cycle being less than a specified second threshold.

4. The method of claim 1, wherein
the detection mode includes an operation mode of obtaining the information about the at least one object, based on a second response signal received in correspondence with outputting of a third chirp signal by the electronic device, and
the reception mode includes an operation mode of obtaining the information about the at least one object, based on the received second chirp signal.

5. The method of claim 1, further comprising synchronizing a third chirp signal output by the first radar sensor with the received first chirp signal.

6. The method of claim 5, wherein
the obtaining of the information about the at least one object located within a specified proximity of the electronic device comprises:
generating an intermediate frequency signal based on the synchronized third chirp signal of the first radar sensor and the second chirp signal; and
obtaining the information about the at least one object based on the intermediate frequency signal,
the information about the at least one object comprising location information about the at least one object and motion information about the at least one object,
the location information comprising information about a distance between the electronic device and the at least one object located within the specified proximity of the electronic device and information about an angle between the at least one object and the electronic device, and
the motion information comprising information about a speed of the at least one object.

7. The method of claim 6, further comprising:
determining whether the at least one object is located within a first search range of the electronic device determined by at least one of a specified first distance and a specified first angle, based on at least one of the distance information and the angle information; and
adjusting a brightness of a display of the electronic device based on whether the at least one object is located within the first search range.

8. The method of claim 1, wherein the first response signal is received by the second radar sensor from an external source in correspondence with the first chirp signal output by the second radar sensor.

9. An electronic device configured to transmit and receive a radar signal, the electronic device comprising:
a first radar sensor comprising a receiver and a transmitter;
a display;
a memory storing one or more instructions; and
at least one processor, comprising processor circuitry, configured, individually and/or collectively, to execute the one or more instructions to: control the first radar sensor to receive a first chirp signal from a second radar sensor located outside the electronic device through the receiver of the first radar sensor, wherein the first chirp signal is outputted to at least one object to sense the at least one object located within a specified proximity of the electronic device and to the first radar sensor of the electronic device;
control an operation mode of the first radar sensor to change from a detection mode to a reception mode based on the received first chirp signal;
control the first radar sensor to receive a second chirp signal generated by the second radar sensor through the receiver of the first radar sensor based on the change to the reception mode, wherein the second chirp signal is generated based on the first chirp signal and a first response signal which is reflected by the at least one object, in correspondence with the outputting of the first chirp signal; and
control information about the at least one object located within a specified proximity of the electronic device to be obtained based on the received second chirp signal.

10. The electronic device of claim 9, wherein the at least one processor is configured to, based on an average intensity of the first chirp signal during a specified first cycle being equal to or greater than a specified first threshold, control the operation mode of the first radar sensor to be changed from the detection mode to the reception mode.

11. The electronic device of claim 10, wherein the at least one processor is configured to execute the one or more instructions to, based on an average intensity of the first chirp signal during a specified second cycle being equal to or less than a specified second threshold, control the operation mode of the first radar sensor to be changed from the reception mode to the detection mode.

12. The electronic device of claim 9, wherein the at least one processor is further configured to execute the one or more instructions to:

control the information about the at least one object to be obtained based on a second response signal received in correspondence with outputting of a third chirp signal in the detection mode; and control the information about the at least one object to be obtained based on the received second chirp signal in the reception mode.

13. The electronic device of claim 9, wherein the at least one processor is further configured to execute the one or more instructions to control the third chirp signal output by the first radar sensor to be synchronized with the received first chirp signal.

14. The electronic device of claim 13, wherein
the at least one processor is further configured to execute the one or more instructions to:
control an intermediate frequency signal to be generated based on the synchronized third chirp signal of the first radar sensor and the second chirp signal; and
control the information about the at least one object to be obtained based on the intermediate frequency signal,
the information about the at least one object comprising location information about the at least one object and motion information about the at least one object,
the location information comprising information about a distance between the electronic device and the at least one object located within the specified proximity of the electronic device and information about an angle between the at least one object and the electronic device, and
the motion information comprising information about a speed of the at least one object.

15. The electronic device of claim 14, further comprising a communication interface comprising communication circuitry,
wherein the at least one processor is further configured to execute the one or more instructions to control the communication interface to transmit the information about the at least one object located within the specified proximity of the electronic device to an external electronic device.

16. The electronic device of claim 14, wherein the at least one processor is further configured to execute the one or more instructions to:
determine whether the at least one object is located within a first search range of the electronic device determined by at least one of a specified first distance and a specified first angle, based on at least one of the distance information and the angle information; and
control a brightness of the display to be adjusted based on whether the at least one object is located within the first search range.

17. The electronic device of claim 14, wherein the at least one processor is further configured to execute the one or more instructions to:
determine whether the at least one object is located within a second search range of the electronic device determined by at least one of a specified second distance and a specified second angle, based on at least one of the distance information and the angle information; and
control a message including the information about the at least one object to be output to the display of the electronic device, based on the at least one object being located within the second search range.

18. The electronic device of claim 9,
wherein
the electronic device includes a digital display device,
the first radar sensor is attached to a portion of the digital display device, and
the second radar sensor is attached to a portion of a bezel detachable from the digital display device.

19. A radar sensor device configured to transmit and receive a radar signal, the radar sensor device comprising:
a signal generator configured to generate a first chirp signal;
a transmitter configured to output the first chirp signal, wherein the first chirp signal is outputted to at least one object to sense the at least one object located within a specified proximity of an electronic device and to a first radar sensor of an electronic device;
a receiver configured to receive a first response signal in correspondence with the outputting of the first chirp signal; and
a modulator configured to modulate the first chirp signal into a second chirp signal so that the second chirp signal corresponds to serial data generated based on the first response signal and the first chirp signal, wherein the second chirp signal is generated based on the first chirp signal and the first response signal which is reflected by the at least one object, in correspondence with the outputting of the first chirp signal,
wherein the transmitter is further configured to transmit the second chirp signal to the electronic device.

20. A non-transitory computer-readable recording medium having recorded thereon a computer program, which, when executed by a computer, performs operations recited in claim 1.

* * * * *